US011184224B2

(12) United States Patent
Johnson et al.

(10) Patent No.: US 11,184,224 B2
(45) Date of Patent: Nov. 23, 2021

(54) SYSTEM, METHOD AND COMPUTE PROGRAM PRODUCT FOR ACCESSING A DEVICE ON A NETWORK

(71) Applicant: REMOT3.IT, INC., Palo Alto, CA (US)

(72) Inventors: Michael W. Johnson, Petaluma, CA (US); Ryo Koyama, Palo Alto, CA (US); Michael J.S. Smith, Palo Alto, CA (US)

(73) Assignee: REMOT3.IT, INC., Palo Alto, CA (US)

( * ) Notice: Subject to any disclaimer, the term of this patent is extended or adjusted under 35 U.S.C. 154(b) by 0 days.

(21) Appl. No.: 16/459,403

(22) Filed: Jul. 1, 2019

(65) Prior Publication Data
US 2019/0327135 A1    Oct. 24, 2019

Related U.S. Application Data

(63) Continuation-in-part of application No. 15/613,281, filed on Jun. 5, 2017, now Pat. No. 10,637,724, which is a continuation-in-part of application No. 15/202,489, filed on Jul. 5, 2016, now abandoned, which is a continuation-in-part of application No. 13/918,773, filed on Jun. 14, 2013, now abandoned, (Continued)

(51) Int. Cl.
| G06F 13/00 | (2006.01) |
| H04L 12/24 | (2006.01) |
| H04L 29/06 | (2006.01) |
| H04L 29/08 | (2006.01) |
| G06Q 10/10 | (2012.01) |
| H01L 29/12 | (2006.01) |
| H04L 29/12 | (2006.01) |

(52) U.S. Cl.
CPC ....... *H04L 41/0803* (2013.01); *G06Q 10/103* (2013.01); *H04L 63/105* (2013.01); *H04L 67/125* (2013.01); *H04L 67/34* (2013.01); *H01L 29/12* (2013.01); *H04L 29/12* (2013.01); *H04L 67/025* (2013.01)

(58) Field of Classification Search
CPC ....... H04L 63/10; H04L 63/105; H04L 67/34; H04L 63/02; H04L 69/16; H04L 41/0809; H04L 41/0803; H04L 67/125; H04L 69/321; H04L 29/12; H04L 41/0213; H04L 61/2015; H04L 61/2517; H04L 67/025; H04L 61/2589; H04L 61/2575; H04W 4/70; G06Q 10/103; H01L 29/12
USPC ........ 709/220–222, 229, 225, 226, 224, 223
See application file for complete search history.

(56) References Cited

U.S. PATENT DOCUMENTS

| 5,787,246 A | 7/1998 | Lichtman et al. |
| 5,887,139 A | 3/1999 | Madison, Jr. et al. |
| (Continued) | | |

OTHER PUBLICATIONS

Notice of Allowance from U.S. Appl. No. 14/589,951, dated May 22, 2015.

(Continued)

*Primary Examiner* — Kenneth R Coulter
(74) *Attorney, Agent, or Firm* — Zilka-Kotab, P.C.

(57) ABSTRACT

A system, method, and computer program product are provided for accessing a device connected to a network. In operation, a device connected to a network is accessed by multiplexing and demultiplexing multiple connections.

17 Claims, 5 Drawing Sheets

Related U.S. Application Data and a continuation-in-part of application No. 14/499,362, filed on Sep. 29, 2014, now abandoned, and a continuation-in-part of application No. 14/517,843, filed on Oct. 18, 2014, now abandoned, and a continuation-in-part of application No. 14/520,389, filed on Oct. 22, 2014, now abandoned, and a continuation-in-part of application No. 14/493,278, filed on Sep. 22, 2014, now abandoned, and a continuation-in-part of application No. 14/956,386, filed on Dec. 1, 2015, now Pat. No. 9,712,486, which is a continuation-in-part of application No. 14/589,951, filed on Jan. 5, 2015, now Pat. No. 9,231,904, which is a continuation-in-part of application No. 14/534,155, filed on Nov. 5, 2014, now abandoned, which is a continuation-in-part of application No. 13/865,910, filed on Apr. 18, 2013, now Pat. No. 9,253,031, which is a continuation of application No. 11/860,876, filed on Sep. 25, 2007, now Pat. No. 8,447,843.

(60) Provisional application No. 61/660,619, filed on Jun. 15, 2012, provisional application No. 60/883,637, filed on Jan. 5, 2007, provisional application No. 60/826,887, filed on Sep. 25, 2006.

(56) References Cited

U.S. PATENT DOCUMENTS

| | | | |
|---|---|---|---|
| 6,012,088 A | 1/2000 | Li et al. | |
| 6,028,848 A | 2/2000 | Bhatia et al. | |
| 6,073,172 A | 6/2000 | Frailong et al. | |
| 6,393,484 B1 | 5/2002 | Massarani | |
| 6,429,893 B1 | 8/2002 | Xin | |
| 6,601,093 B1 | 7/2003 | Peters | |
| 6,647,389 B1 | 11/2003 | Fitch et al. | |
| 6,686,838 B1 | 2/2004 | Rezvani et al. | |
| 6,735,619 B1 | 5/2004 | Sawada | |
| 6,938,089 B1 | 8/2005 | Slaby et al. | |
| 6,943,681 B2 | 9/2005 | Rezvani et al. | |
| 7,079,520 B2 | 7/2006 | Feige et al. | |
| 7,124,397 B1 | 10/2006 | Mathur et al. | |
| 7,240,106 B2 | 7/2007 | Cochran et al. | |
| 7,250,854 B2 | 7/2007 | Rezvani et al. | |
| 7,315,886 B1 | 1/2008 | Meenan et al. | |
| 7,324,473 B2* | 1/2008 | Corneille | H04L 61/1511 370/328 |
| 7,412,542 B1 | 8/2008 | Newson et al. | |
| 7,430,535 B2* | 9/2008 | Dougherty | G06Q 30/02 705/38 |
| 7,543,145 B2 | 6/2009 | Olson et al. | |
| 7,558,862 B1 | 7/2009 | Tyukasz et al. | |
| 7,609,721 B2 | 10/2009 | Rao et al. | |
| 7,752,202 B2 | 7/2010 | Kobori et al. | |
| 7,774,437 B2 | 8/2010 | Crosier et al. | |
| 7,779,052 B2* | 8/2010 | Golobay | H04L 41/22 707/803 |
| 7,796,023 B2 | 9/2010 | Rezvani et al. | |
| 7,808,906 B2 | 10/2010 | Rao et al. | |
| 7,895,445 B1 | 2/2011 | Albanese et al. | |
| 7,912,046 B2 | 3/2011 | Li et al. | |
| 7,974,277 B2 | 7/2011 | Bao et al. | |
| 7,992,209 B1 | 8/2011 | Menoher et al. | |
| 8,014,421 B2 | 9/2011 | Rao et al. | |
| 8,046,830 B2 | 10/2011 | Rao et al. | |
| 8,065,418 B1 | 11/2011 | Abuan et al. | |
| 8,086,740 B2 | 12/2011 | Tyukasz et al. | |
| 8,099,764 B2 | 1/2012 | Herzog et al. | |
| 8,149,851 B2 | 4/2012 | Asnis et al. | |
| 8,208,413 B1 | 6/2012 | Bienn et al. | |
| 8,266,689 B2 | 9/2012 | Menoher et al. | |
| 8,296,437 B2 | 10/2012 | Pankratov | |
| 8,351,333 B2 | 1/2013 | Rao et al. | |
| 8,353,022 B1 | 1/2013 | Menoher et al. | |
| 8,358,635 B2 | 1/2013 | Feige et al. | |
| 8,370,907 B1 | 2/2013 | Potter et al. | |
| 8,447,843 B2 | 5/2013 | Johnson et al. | |
| 8,526,405 B2 | 9/2013 | Curtis et al. | |
| 8,601,054 B2 | 12/2013 | Bagwell et al. | |
| 8,627,424 B1 | 1/2014 | O'Malley et al. | |
| 8,634,420 B2 | 1/2014 | Rao et al. | |
| 8,713,142 B2* | 4/2014 | Golobay | H04L 41/024 709/223 |
| 8,723,664 B2 | 5/2014 | Rezvani et al. | |
| 8,769,057 B1 | 7/2014 | Breau et al. | |
| 8,831,222 B2 | 9/2014 | Menoher et al. | |
| 8,898,227 B1 | 11/2014 | Mraz et al. | |
| 8,935,691 B2 | 1/2015 | Ben Ayed | |
| 9,231,904 B2 | 1/2016 | Johnson et al. | |
| 9,253,031 B2 | 2/2016 | Johnson et al. | |
| 9,532,092 B1 | 12/2016 | Suryanarayanan et al. | |
| 9,712,486 B2 | 7/2017 | Johnson et al. | |
| 2001/0018697 A1 | 8/2001 | Kunitake et al. | |
| 2002/0091791 A1 | 7/2002 | Kang | |
| 2002/0143984 A1 | 10/2002 | Michel | |
| 2002/0156917 A1 | 10/2002 | Nye | |
| 2002/0161602 A1* | 10/2002 | Dougherty | G06Q 10/103 705/80 |
| 2002/0169650 A1* | 11/2002 | Dougherty | G06Q 30/02 705/38 |
| 2003/0040937 A1 | 2/2003 | Gregersen et al. | |
| 2003/0065947 A1 | 4/2003 | Song et al. | |
| 2003/0217158 A1 | 11/2003 | Datta | |
| 2004/0054925 A1 | 3/2004 | Etheridge et al. | |
| 2004/0059821 A1 | 3/2004 | Tang et al. | |
| 2004/0098507 A1 | 5/2004 | Thubert et al. | |
| 2004/0133689 A1 | 7/2004 | Vasisht | |
| 2004/0172396 A1 | 9/2004 | Vanska et al. | |
| 2004/0199615 A1 | 10/2004 | Philyaw | |
| 2005/0063357 A1 | 3/2005 | Wewalaarachchi et al. | |
| 2005/0073982 A1* | 4/2005 | Corneille | H04L 29/12066 370/338 |
| 2005/0075115 A1 | 4/2005 | Corneille et al. | |
| 2005/0114492 A1 | 5/2005 | Arberg et al. | |
| 2005/0114653 A1 | 5/2005 | Sudia | |
| 2005/0147088 A1 | 7/2005 | Bao et al. | |
| 2005/0229238 A1 | 10/2005 | Ollis et al. | |
| 2005/0249196 A1 | 11/2005 | Ansari et al. | |
| 2006/0039356 A1 | 2/2006 | Rao et al. | |
| 2006/0075226 A1 | 4/2006 | Aksu et al. | |
| 2006/0100934 A1* | 5/2006 | Burr | G06Q 10/06 705/26.81 |
| 2006/0120305 A1 | 6/2006 | Van Den Bosch et al. | |
| 2006/0155833 A1 | 7/2006 | Matsuda et al. | |
| 2006/0168022 A1 | 7/2006 | Levin et al. | |
| 2006/0174120 A1 | 8/2006 | Rippy et al. | |
| 2006/0288071 A1 | 12/2006 | Bigioi et al. | |
| 2007/0022185 A1 | 1/2007 | Hamilton et al. | |
| 2007/0067431 A1 | 3/2007 | Yoshihara et al. | |
| 2007/0136319 A1* | 6/2007 | Golobay | H04L 41/0803 |
| 2007/0136371 A1* | 6/2007 | Golobay | H04L 63/102 |
| 2007/0201622 A1 | 8/2007 | Croak et al. | |
| 2007/0260738 A1 | 11/2007 | Palekar et al. | |
| 2008/0034073 A1 | 2/2008 | McCloy et al. | |
| 2008/0046735 A1 | 2/2008 | Nedeltchev et al. | |
| 2008/0077425 A1 | 3/2008 | Johnson et al. | |
| 2008/0275997 A1 | 11/2008 | Gavin et al. | |
| 2009/0013063 A1 | 1/2009 | Soman | |
| 2010/0146110 A1 | 6/2010 | Christensen et al. | |
| 2010/0322393 A1 | 12/2010 | Jin et al. | |
| 2011/0055322 A1 | 3/2011 | Gregersen | |
| 2011/0252116 A1 | 10/2011 | Menoher et al. | |
| 2011/0307263 A1 | 12/2011 | Bader et al. | |
| 2011/0314011 A1 | 12/2011 | Buehrer et al. | |
| 2012/0117649 A1 | 5/2012 | Holloway et al. | |
| 2012/0137210 A1 | 5/2012 | Dillon | |
| 2012/0137213 A1 | 5/2012 | Hayler et al. | |
| 2012/0173610 A1 | 7/2012 | Bleau et al. | |
| 2012/0254976 A1 | 10/2012 | Armstrong et al. | |
| 2012/0290950 A1 | 11/2012 | Rapaport et al. | |
| 2012/0331097 A1 | 12/2012 | Menoher et al. | |
| 2013/0031356 A1 | 1/2013 | Prince et al. | |

(56) References Cited

U.S. PATENT DOCUMENTS

| | | | |
|---|---|---|---|
| 2013/0053137 A1 | 2/2013 | Nelson et al. | |
| 2013/0097283 A1 | 4/2013 | Menoher et al. | |
| 2013/0232243 A1 | 9/2013 | Johnson et al. | |
| 2013/0276136 A1 | 10/2013 | Goodwin et al. | |
| 2013/0311574 A1 | 11/2013 | Lal | |
| 2013/0339509 A1 | 12/2013 | Johnson et al. | |
| 2014/0089344 A1 | 3/2014 | Hong et al. | |
| 2014/0337407 A1 | 11/2014 | Mraz et al. | |
| 2015/0052253 A1 | 2/2015 | Johnson et al. | |
| 2015/0052258 A1 | 2/2015 | Johnson et al. | |
| 2015/0088982 A1 | 3/2015 | Johnson et al. | |
| 2015/0100952 A1 | 4/2015 | Tornow et al. | |
| 2015/0113172 A1 | 4/2015 | Johnson et al. | |
| 2015/0156162 A1 | 6/2015 | Kaliski, Jr. et al. | |
| 2016/0087933 A1 | 3/2016 | Johnson et al. | |
| 2016/0112262 A1 | 4/2016 | Johnson et al. | |
| 2016/0140611 A1 | 5/2016 | Schler et al. | |
| 2016/0315824 A1 | 10/2016 | Johnson et al. | |
| 2016/0344745 A1 | 11/2016 | Johnson et al. | |
| 2017/0111665 A1 | 4/2017 | Suryanarayanan et al. | |
| 2017/0272316 A1 | 9/2017 | Johnson et al. | |

OTHER PUBLICATIONS

Notice of Allowance from U.S. Appl. No. 14/589,951, dated Oct. 23, 2015.
Non-Final Office Action from U.S. Appl. No. 14/534,155, dated Sep. 7, 2016.
Non-Final Office Action from U.S. Appl. No. 13/865,910, dated Dec. 4, 2013.
Final Office Action from U.S. Appl. No. 13/865,910, dated Jul. 16, 2014.
Non-Final Office Action from U.S. Appl. No. 13/865,910, dated Jun. 11, 2015.
Notice of Allowance from U.S. Appl. No. 13/865,910, dated Nov. 12, 2015.
Non-Final Office Action from U.S. Appl. No. 11/860,876, dated Nov. 3, 2009.
Final Office Action from U.S. Appl. No. 11/860,876, dated May 12, 2010.
Non-Final Office Action from U.S. Appl. No. 11/860,876, dated Aug. 14, 2012.
Notice of Allowance from U.S. Appl. No. 11/860,876, dated Jan. 18, 2013.
Non-Final Office Action from U.S. Appl. No. 14/520,389, dated Oct. 4, 2016.
Non-Final Office Action from U.S. Appl. No. 15/202,489, dated Sep. 23, 2016.
Final Office Action from U.S. Appl. No. 15/202,489, dated May 19, 2017.
Non-Final Office Action from U.S. Appl. No. 13/918,773, dated Jun. 18, 2015.
Non-Final Office Action from U.S. Appl. No. 13/918,773, dated Feb. 3, 2016.
Non-Final Office Action from U.S. Appl. No. 14/499,362, dated Jul. 1, 2016.
Non-Final Office Action from U.S. Appl. No. 14/517,843, dated May 6, 2016.
Non-Final Office Action from U.S. Appl. No. 14/493,278, dated Mar. 30, 2016.
Final Office Action from U.S. Appl. No. 14/493,278, dated Oct. 18, 2016.
International Search Report and Written Opinion of PCT Application No. PCT/US2013/046004, dated Jan. 10, 2014.
International Preliminary Report of PCT Application No. PCT/US2007/020750 dated Oct. 24, 2008.
International Search Report and Written Opinion of PCT application No. PCT/US2007/020750 dated Mar. 7, 2008.
Cantanzariti, "Accessing localhost From Anywhere," sitepoint.com, Mar. 14, 2014, pp. 1-15.
Eppinger, "TCP Connections for P2P Apps: A Software Approach to Solving the NAT Problem," Institute for Software Research, 2005, cover page plus pp. 1-8.
Finch, "Frequently Asked Questions," Finch.com, Nov. 2, 2014, pp. 1-11, retrieved from https://web.archive.org/web/20150317191932/https://meetfinch.com/docs/faq.
Ford et al., "Peer-to-Peer Communication Across Network Address Translators," USENIX Annual Technical Conference, 2005, pp. 179-192.
Github, "progrium/localtunnel," GitHub.com, 2013, Code Version 182, Latest Commit: 08f3ac0f15, Nov. 21, 2013, pp. 1-2, retrieved from https://github.com/progrium/localtunnel.
Guha et al., "Characterization and Measurement of TCP Traversal through NATs and Firewalls," USENIX Association, Internet Measurement Conference, 2005, pp. 199-211.
Hao et al., "Network address translation traversal based on Bernoulli laws of large number in P2P streaming system," High Technology Letters, vol. 17, No. 4, Dec. 2011, pp. 401-406.
Ho et al., "NAT-Compatibility Testbed: An Environment to Automatically Verify Direct Connection Rate," IEEE Communications Letters, vol. 15, No. 1, Jan. 2011, pp. 4-6.
Ho et al., "To Call or To Be Called Behind NATs is Sensitive in Solving the Direct Connection Problem," IEEE Communications Letters, vol. 15, No. 1, Jan. 2011, pp. 94-96.
Huang et al., "SmartTunnel Union for NAT Traversal," Proceedings of the 2005 Fourth IEEE International Symposium on Network Computing and Applications, 2005, 4 pages.
Lebkicher, "Role Based Access Control," SANS Institute, Nov. 30, 2000, pp. 1-11.
Levkowetz et al., "Mobile IP Traversal of Network Address Translation (NAT) Devices," The Internet Society, Apr. 2003, pp. 1-16.
Levkowetz et al., "Mobile IP Traversal of Network Address Translation (NAT) Devices," The Internet Society, Apr. 2003, pp. 17-34.
Lindsay, J., "Localtunnel Protocol," GitHub.com, Dec. 24, 2012, pp. 1-3.
Lindsay, J., "Where did Localtunnel come from?" Progrium.com, 2014, 3 pages.
Microsoft, "Teredo Overview," Microsoft, Jan. 1, 2003, pp. 1-18.
Microsoft, "Walkthrough: Encrypting Configuration Information Using Protected Configuration," Microsoft.com, Oct. 21, 2014, 7 pages, retrieved from http://msdn.microsoft.com/en-us/library/dtkwfdky(v=vs.90).aspx.
Muller et al., "Behavior and Classification of NAT devices and implications for NAT Traversal," IEEE Network Special Issue on Implications and Control of Middleboxes, Oct. 2008, pp. 1-6.
Muller et al., "On the Applicability of knowledge based NAT-Traversal for Home Networks," International Federation for Information Processing, 2008, pp. 264-275.
Muller et al., "Autonomous NAT Traversal," IEEE Tenth International Conference on Peer-to-Peer Computing (P2P), Sep. 2010, 4 pages, retrieved from https://www.researchgate.net/publication/224173905_Autonomous_NAT_Traversal.
PageKite, "The PageKite Protocol," PageKite.net, Mar. 17, 2011, pp. 1-12, retrieved from https://pagekite.net/wiki/Floss/PageKiteProtocol/.
Perreault et al., "Traversal Using Relays around NAT (TURN) Extensions for TCP Allocations," Internet Engineering Task Force (IETF), Nov. 2010, pp. 1-13.
Rosenberg et al., "STUN—Simple Traversal of User Datagram Protocol (UDP) Through Network Address Translators (NATs)," The Internet Society, 2003, pp. 1-15.
Rosenberg et al., "STUN—Simple Traversal of User Datagram Protocol (UDP) Through Network Address Translators (NATs)," The Internet Society, 2003, pp. 16-30.
Rosenberg et al., "STUN—Simple Traversal of User Datagram Protocol (UDP) Through Network Address Translators (NATs)," The Internet Society, 2003, pp. 31-44.
Rosenberg et al., "Session Traversal Utilities for NAT (STUN)," IETF Trust, Oct. 2008, pp. 1-17.
Rosenberg et al., "Session Traversal Utilities for NAT (STUN)," IETF Trust, Oct. 2008, pp. 18-34.
Rosenberg et al., "Session Traversal Utilities for NAT (STUN)," IETF Trust, Oct. 2008, pp. 35-51.

(56) References Cited

OTHER PUBLICATIONS

Rosenberg et al., "Traversal Using Relays around NAT (TURN) Extensions for TCP Allocations", Nov. 2010, pp. 1-13.
Keranen et al., "Interactive Connectivity Establishment (ICE): A Protocol for Network Address Translator (NAT) Traversal for Offer/Answer Protocols," Internet Engineering Task Force, Feb. 25, 2013, pp. 1-20.
Keranen et al., "Interactive Connectivity Establishment (ICE): A Protocol for Network Address Translator (NAT) Traversal for Offer/Answer Protocols," Internet Engineering Task Force, Feb. 25, 2013, pp. 21-40.
Keranen et al., "Interactive Connectivity Establishment (ICE): A Protocol for Network Address Translator (NAT) Traversal for Offer/Answer Protocols," Internet Engineering Task Force, Feb. 25, 2013, pp. 41-60.
Keranen et al., "Interactive Connectivity Establishment (ICE): A Protocol for Network Address Translator (NAT) Traversal for Offer/Answer Protocols," Internet Engineering Task Force, Feb. 25, 2013, pp. 61-80.
Keranen et al., "Interactive Connectivity Establishment (ICE): A Protocol for Network Address Translator (NAT) Traversal for Offer/Answer Protocols," Internet Engineering Task Force, Feb. 25, 2013, pp. 81-89.
Savin, "Digging Tunnels," red-badger.com, May 12, 2014, pp. 1-7.
Sheehan, "A Survey of the Localhost Proxying Landscape," john-sheehan.com, Aug. 5, 2013, pp. 1-4.
Shreve, A., "ngrok tunnels: better, faster, stronger," inconshreveable.com, Sep. 2013, 4 pages, retrieved from https://web.archive.org/web/20190619005101/https://inconshreveable.com/09-25-2013/ngrok-tunnels-better-faster-stronger/.
Stackoverflow, "How can I programmatically generate Heroku-like subdomain names?", Stackoverflow.com, Oct. 1, 2011, 2 pages, retrieved from http://stackoverflow.com/questions/762134 1/how-can-i-programmatically-generate-heroku-like-subdomain-names.
Stiemerling et al., "NAT and Firewall Traversal Issues of Host Identity Protocol (HIP) Communication," IETF Trust, Apr. 2008, pp. 1-13.
Tamberg, "Yaler Protocol Documentation," Yaler.net, Sep. 11, 2012, pp. 1-5.
Ttsai, "A Study of P2P Traversal Through Symmetric Nat," VDM Publishing, 2010, 1 page.
Wacker et al., "A NAT Traversal Mechanism for Peer-To-Peer Networks," IEEE Eight International Conference on Peer-to-Peer Computing, 2008, pp. 81-83.
Wang et al., "Research on Symmetric NAT Traversal in P2P applications," Proceedings of the International Multi-Conference on Computing in the Global Infonnation Technology, 2006, 6 pages.
Xu et al., "Research and implementation of P2P communications scheme based on NAT-traversal technologies," (English Abstract Only), Computer Engineering and Design, vol. 28, No. 7, Apr. 2007, pp. 1559-1603.
Shtylman et al., "Localtunnel.me," Y combinator.com, accessed on Nov. 2, 2014, 6 pages, retrieved from https://news.ycombinator.com/item?id=7585056.
Ycombinator, "Finch-local port forwarding", Y combinator.com, accessed on Nov. 2, 2014, pp. 1-7, retrieved from https://news.ycombinator.com/item?id=7763688.
Yoshimi et al., "NAT Traversal Technology of Reducing Load on Relaying Server for P2P Connections," IEEE, Jan. 2007, pp. 100-104.
Non-Final Office Action from U.S. Appl. No. 15/613,281, dated Sep. 20, 2018.
Notice of Allowance from U.S. Appl. No. 15/613,281, dated Apr. 9, 2019.
Notice of Allowance from U.S. Appl. No. 14/956,386, dated Mar. 3, 2017.

* cited by examiner

SYSTEM, METHOD AND COMPUTE PROGRAM PRODUCT FOR ACCESSING A DEVICE ON A NETWORK

RELATED APPLICATIONS

The present application is a continuation-in-part of U.S. patent application Ser. No. 15/613,281 filed Jun. 5, 2017, entitled "MANAGING NETWORK CONNECTED DEVICES,(now U.S. Pat. No. 10,637,724)" which is a continuation-in-part of U.S. patent application Ser. No. 15/202,489 filed Jul. 5, 2016, entitled "NETWORKING SYSTEMS", which is a continuation-in-part of, and claims the benefit to U.S. patent application Ser. No. 13/918,773, filed Jun. 14, 2013, entitled "NETWORKING SYSTEMS", which in turn claims priority to U.S. Provisional Patent Application No. 61/660,619, filed Jun. 15, 2012, entitled "NETWORKING SYSTEMS." The foregoing applications and/or patents are herein incorporated by reference in their entirety for all purposes.

Additionally, U.S. patent application Ser. No. 15/202,489 is a continuation-in-part of U.S. patent application Ser. No. 14/499,362 filed Sep. 29, 2014, entitled "DIRECT MAP PROXY SYSTEM AND PROTOCOL". The foregoing applications and/or patents are herein incorporated by reference in their entirety for all purposes.

Additionally, U.S. patent application Ser. No. 15/202,489 is a continuation-in-part of U.S. patent application Ser. No. 14/517,843 filed Oct. 18, 2014, entitled "INSTALLATION AND CONFIGURATION OF CONNECTED DEVICES". The foregoing applications and/or patents are herein incorporated by reference in their entirety for all purposes.

Additionally, U.S. patent application Ser. No. 15/202,489 is a continuation-in-part of U.S. patent application Ser. No. 14/520,389 filed Oct. 22, 2014, entitled "METHOD AND PROTOCOL FOR SECURE DEVICE DEPLOYMENT USING A PARTIALLY-ENCRYPTED PROVISIONING FILE". The foregoing applications and/or patents are herein incorporated by reference in their entirety for all purposes.

Additionally, U.S. patent application Ser. No. 15/202,489 is a continuation-in-part of U.S. patent application Ser. No. 14/493,278 filed Sep. 22, 2014, entitled "MULTI-SERVER FRACTIONAL SUBDOMAIN DNS PROTOCOL". The foregoing applications and/or patents are herein incorporated by reference in their entirety for all purposes.

Additionally, U.S. patent application Ser. No. 15/202,489 is a continuation-in-part of U.S. patent application Ser. No. 14/956,386 filed Dec. 1, 2015, entitled "TECHNIQUES FOR THE DEPLOYMENT AND MANAGEMENT OF NETWORK CONNECTED DEVICES" (now U.S. Pat. No. 9,712,486), which is a continuation-in-part of U.S. patent application Ser. No. 14/589,951 filed Jan. 5, 2015, entitled "DEPLOYING AND MANAGING NETWORKED DEVICES" (now U.S. Pat. No. 9,231,904), which is a continuation-in-part of U.S. patent application Ser. No. 14/534,155 filed Nov. 5, 2014, entitled "LOAD BALANCED INTER-DEVICE MESSAGING", which is a continuation-in-part of U.S. patent application Ser. No. 13/865,910 filed Apr. 18, 2013, entitled "SYSTEM, METHOD AND COMPUTER PROGRAM PRODUCT FOR IDENTIFYING, CONFIGURING AND ACCESSING A DEVICE ON A NETWORK" (now U.S. Pat. No. 9,253,031), which is a continuation of U.S. patent application Ser. No. 11/860,876 filed Sep. 25, 2007, entitled "SYSTEM, METHOD AND COMPUTER PROGRAM PRODUCT FOR IDENTIFYING, CONFIGURING AND ACCESSING A DEVICE ON A NETWORK" (now U.S. Pat. No. 8,447,843), which in turn claims priority to U.S. Provisional Patent Application No. 60/883,637 filed Jan. 5, 2007, entitled "SYSTEM, METHOD AND COMPUTER PROGRAM PRODUCT FOR ACCESSING A DEVICE ON A NETWORK UTILIZING A UNIVERSAL DEVICE LOCATOR" and to U.S. Provisional Patent Application No. 60/826,887 filed Sep. 25, 2006, entitled "SYSTEM, METHOD AND COMPUTER PROGRAM PRODUCT FOR AUTOMATICALLY IDENTIFYING AND CONFIGURING A DEVICE". The foregoing applications and/or patents are herein incorporated by reference in their entirety for all purposes.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This disclosure relates to the field of network-connected devices and more particularly to techniques for deploying and maintaining Internet-connected networked devices. Embodiments of the present disclosure generally relate to improvements to networking of Internet-connected networked devices.

BACKGROUND

The present disclosure relates to networked devices, IoT devices, and more particularly to deployment, automatic configuration, identification and access of IoT devices. Embodiments of the present disclosure generally relate to improvements to networking systems including, but not limited to, networking of IoT devices.

The Internet of Things (IoT) is the network of physical objects, devices, or "things" embedded with electronics, software, sensors, and network connectivity, which enables these objects, devices, etc. to collect and exchange data. The IoT, for example, allows objects to be sensed and controlled remotely across existing network infrastructure, creating opportunities for more direct integration between the physical world and computer-based systems, and resulting in improved efficiency, accuracy, and economic benefit. Each IoT thing is uniquely identifiable through its embedded computing system but is able to interoperate within the existing Internet infrastructure. Experts estimate that the IoT will consist of almost 50 billion objects by 2020.

Typically, IoT is expected to offer advanced connectivity of devices, systems, and services that goes beyond machine-to-machine communications (M2M) and covers a variety of protocols, domains, and applications. The interconnection of these embedded devices (including smart objects), is expected to usher in automation in nearly all fields, while also enabling advanced applications like a Smart Grid and expanding to the areas such as smart cities.

"Things," in the IoT sense, may refer to a wide variety of devices, including but not limited to, devices such as heart monitoring implants, biochip transponders on farm animals, electric clams in coastal waters, automobiles with built-in sensors, or field operation devices that assist firefighters in search and rescue operations, etc. These devices collect useful data with the help of various existing technologies and then autonomously flow the data between other devices. Consumer market examples include, but are not limited to, devices such as smart thermostat systems and washer/dryers that use Wi-Fi for remote monitoring, etc.

Besides the wide variety of new application areas for Internet connected automation to expand into, IoT is also expected to generate large amounts of data from diverse locations that is aggregated very quickly, thereby increasing the need to better index, store, network, and process such data.

As increasingly more devices (e.g., servers, computers, phones, equipment, appliances, etc.) are connected to the Internet, the need to connect them in a meaningful, fast, secure, and cost-effective way becomes increasingly difficult. Specific scalability challenges related to Domain Name System (DNS) capability and Secure Sockets Layer (SSL) certificate deployment are evident. The function of the DNS, carried out by one or more DNS servers, is to associate various information with Internet domain names. More specifically, it translates more easily memorized domain names (e.g., www.example.com) to their associated numerical IP addresses (e.g., IPv4 or IPv6 addresses) needed for the purpose of locating computer services and devices worldwide. DNS servers resolve (e.g., translate to an IP address) a domain name (e.g., www.example.com) in a hierarchical manner, looking first at the top level domain or TLD (e.g., ".com"), then the domain name (e.g., "example"), and then the sub domain (e.g., "www"). More sub domains (e.g., a second sub domain, a third sub domain) can be included in the URL (e.g., m.www.example.com), limited by a maximum of 123 levels, and a maximum of 253 characters for the entire domain name.

An SSL certificate is a digital certificate that authenticates the identity of a website, application, or device and encrypts exchanged information (e.g., 256-bit encryption) using SSL technology. SSL certificates can secure a single domain name with a single domain certificate (e.g., www.example.com), secure multiple domain names with a multi-name certificate (e.g., both www.example.com and mail.example.com), and secure multiple subdomains of a domain with a wildcard digital security certificate, for example, (e.g., *.example.com). There is an annual cost (e.g., USD$150-$300) and setup resources required (e.g., for generating the CSR, private key, renewal, etc.) when deploying wildcard certificates.

Legacy DNS capability in consideration of SSL certificate limitations presents challenges to secure and cost-effective Internet device scalability. In particular, the handling of wildcards in both the DNS and SSL certificates impacts scalability. For example, legacy DNS capability (e.g., as outlined in Network Working Group RFC 4592, and RFC 1034 sections 4.3.2 and 4.3.3) will only accept wildcards in the left-most subdomain (e.g., *.example.com). To have multiple subdomains translate to two different servers (e.g., servers s1 and s2 to manage resource loading), multiple wildcard DNS records unique to each server (e.g., *.s1.example.com and *.s2.example.com) are required. Likewise, a wildcard SSL certificate can only serve one subdomain level (e.g., *.s1.example.com), so a separate certificate for each server would be required, given the aforementioned DNS addressing limitation. The restrictions of these legacy protocols and systems therefore limit the scaling of devices on the Internet (e.g., adding servers, subdomains, etc.) in a secure and cost-effective manner (e.g., minimizing the deployment of SSL certificates, managing server loading, etc.).

Furthermore, legacy networking environments and systems often include a web server (e.g., Apache web server) that receives mapping directives such as:

ProxyPass/foo/http://s1.example.com/

This directive, for example, will direct a request for "http://example.com/foo/device1" to be mapped into a proxy request to "http://s1.example.com/device1". This mapping can, for example, direct a user request to host server at "example.com" for connection to "device1" to be redirected to a remote server at "s1.example.com" associated with (e.g., physically co-located with) "device1" to complete the connection. Similarly, the reverse mapping, ProxyPassReverse/foo/http://s1.example.com/ converts or maps, for example, "http://s1.example.com/device1" back to "http://example.com/foo/device1" before forwarding the response from the server at "s1.example.com" back to the user. From the user or client side, the request satisfied by the server at "s1.example.com" appears to have been satisfied by "example.com".

While the aforementioned legacy structure (e.g., syntax and semantics) for proxy server mapping provides some simplification of addressing multiple network servers and devices, the structure has limits to scaling of devices on the Internet (e.g., adding devices, servers, subdomains, etc.) in a flexible and efficient manner. Techniques are needed to address the problem of flexibly and efficiently mapping to a large number of devices connected to the Internet using domain names.

The above scenario is further complicated by the fact that many sorts of devices can be connected via the Internet. However, applications pertaining to certain types of connected devices rely on characteristics of the connected network that can be set up during the course of installation and configuration. Legacy installation and configuration fails to account for the specifics of certain connected devices, and in some cases, legacy installation and configuration relies on pre-existing network component configurations that may not fully serve the needs of the aforementioned connected devices. Further, techniques are needed to address the problem of deployment and ongoing management of internet connected devices. The hereinabove problems with deployment are exacerbated since Device deployers and manufacturers need a way to identify deployed devices to the Internet in a way that provides security and authentication. Legacy techniques as are used by applications such as Dropbox and YouTube have offered developers app identification codes ("id's") and/or shared keys that were typically embedded in the app or device. Unfortunately, legacy use of such keys did not include security such as authentication and encryption. Implementation of security was left up to the user. In many cases, identification codes ("id's") and/or shared keys and were often left open in plain text (e.g., unencrypted), and accessible in plain text at or from the device, and/or embedded in plain text in various components of the application (e.g., in plain text embedded in the binary modules of the application).

Techniques are needed to address the security problems that developers and manufactures face, namely how to identify their deployed devices to Internet edge services in a way that provides a specified level of security and authentication. Security and authentication becomes increasingly more important as increasingly more devices (e.g., servers, computers, phones, equipment, cameras, appliances, etc.) are connected to the Internet. The need to connect them in a meaningful, fast, secure, and cost-effective way becomes increasingly difficult. Specific scalability challenges related to managing the messaging between devices are evident.

There are legacy approaches that enable inter-device communication (e.g., between a home security camera and a homeowner's smartphone, etc.). However, these legacy techniques are not well suited to quickly and cost-effectively enable communications from a large number of devices (e.g., all security cameras of a multi-national corporation, etc.). Specific challenges arise in balancing the connection and messaging load on the communication system servers. Techniques are therefore needed to address the problem of cost-effectively scaling the communications with an increasing number of devices connected to the Internet.

None of the aforementioned legacy approaches achieve the capabilities of the herein-disclosed techniques for deploying and maintaining Internet-connected networked devices. There is a need for improvements.

SUMMARY

The present disclosure provides an improved method, system, and computer program product suited to address the aforementioned issues with legacy approaches. More specifically, the present disclosure provides a detailed description of techniques used in methods, systems, and computer program products for deploying and maintaining Internet-connected networked devices. The claimed embodiments address the problem of deploying and managing Internet-connected devices. The disclosure and claims thereto advance the technical fields for addressing the problem of deploying and managing Internet-connected devices, as well as advancing peripheral technical fields. Some claims improve the functioning of multiple systems within the disclosed environments.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

So that the features of various embodiments of the present disclosure can be understood, a more detailed description, briefly summarized above, may be had by reference to various embodiments, some of which are illustrated in the accompanying drawings. It is to be noted, however, that the accompanying drawings illustrate only embodiments and are therefore not to be considered limiting of the scope of the various embodiments of the disclosure, for the embodiment(s) may admit to other effective embodiments. The following detailed description makes reference to the accompanying drawings that are now briefly described.

The drawings described below are for illustration purposes only. The drawings are not intended to limit the scope of the present disclosure.

Figure 1A:
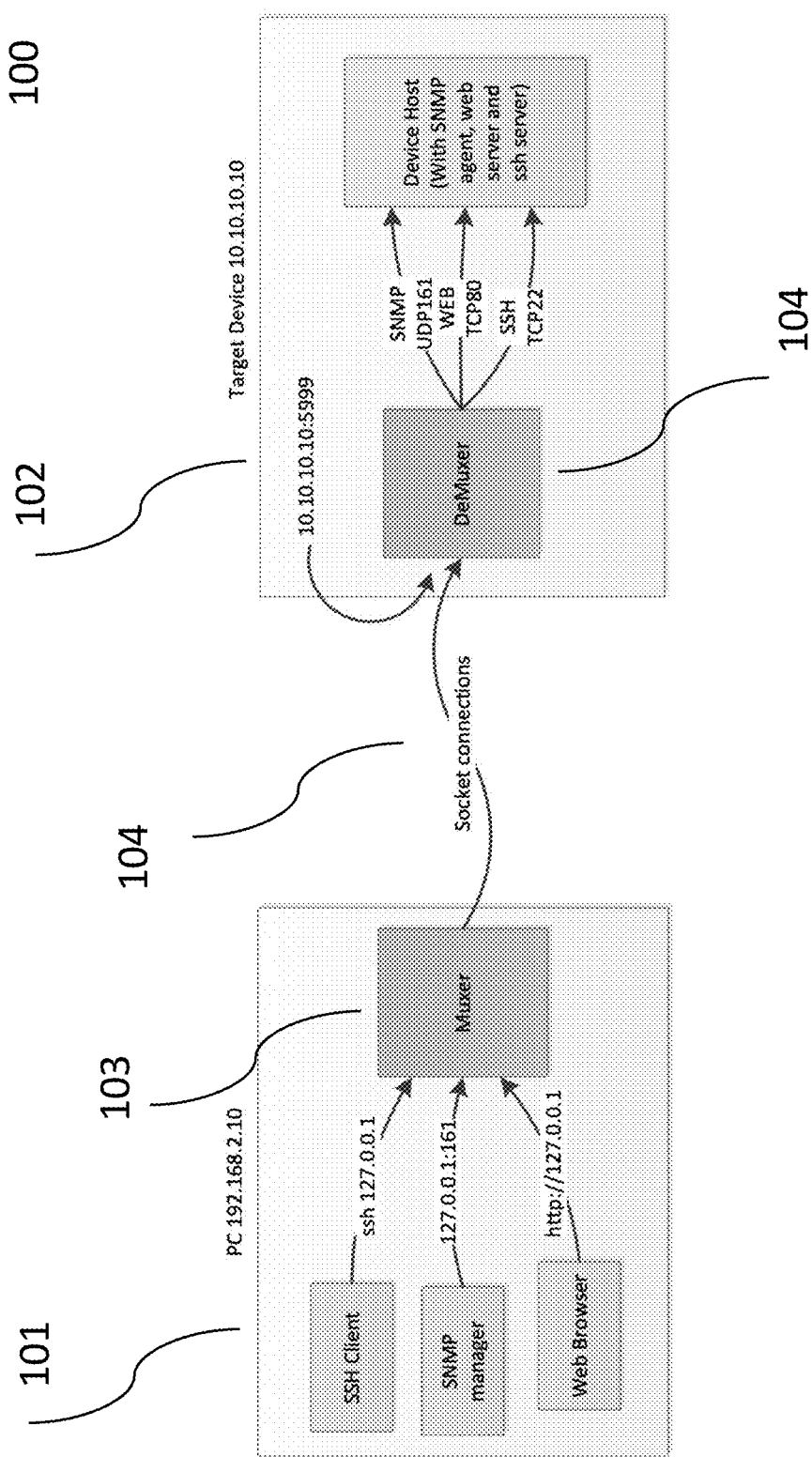

One or more of the various embodiments of the disclosure are susceptible to various modifications, combinations, and alternative forms, various embodiments thereof are shown by way of example in the drawings and will herein be described in detail. It should be understood, however, that the accompanying drawings and detailed description are not intended to limit the embodiment(s) to the particular form disclosed, but on the contrary, the intention is to cover all modifications, combinations, equivalents and alternatives falling within the spirit and scope of the various embodiments of the present disclosure as defined by the relevant claims.

FIG. 1A shows a system that enables connections between devices using a multiplexer and demultiplexer.

Figure 2A:
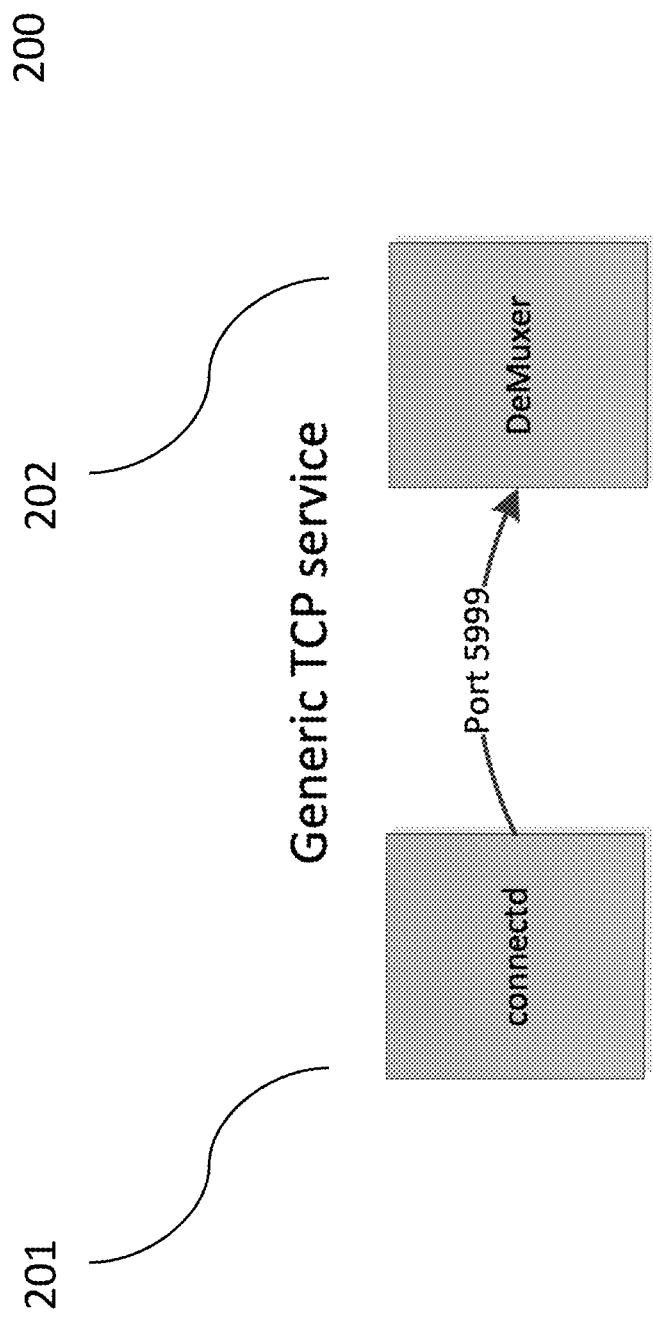

FIG. 2A shows a device including a software daemon and demultiplexer.

Figure 3A:
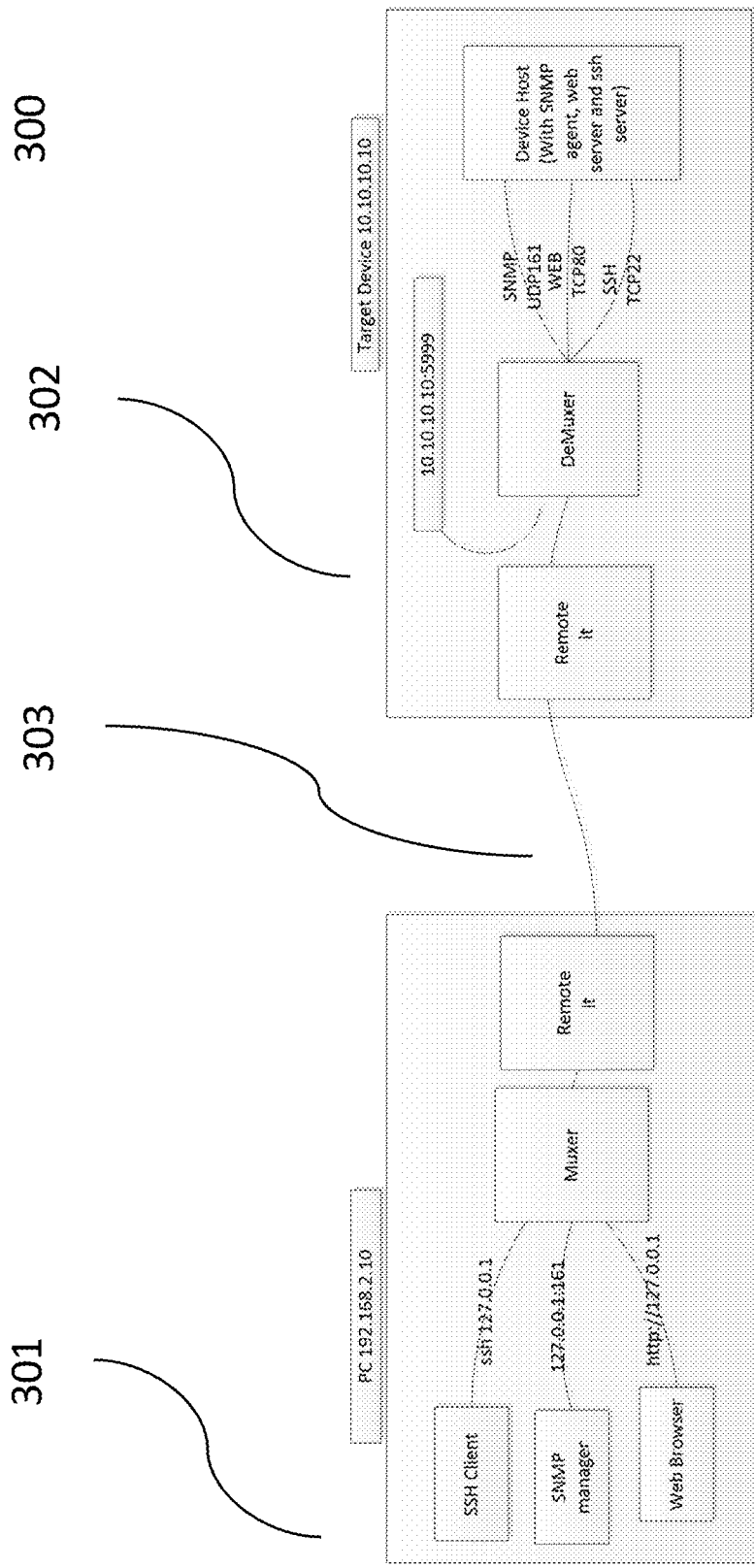

FIG. 3A shows a system 300 that comprises a first device and second device; the first device comprising a multiplexing software component that is the initiator/host side of a connection; the second device comprising a de-multiplexing software component that is the target side of the connection.

Figure 4A:
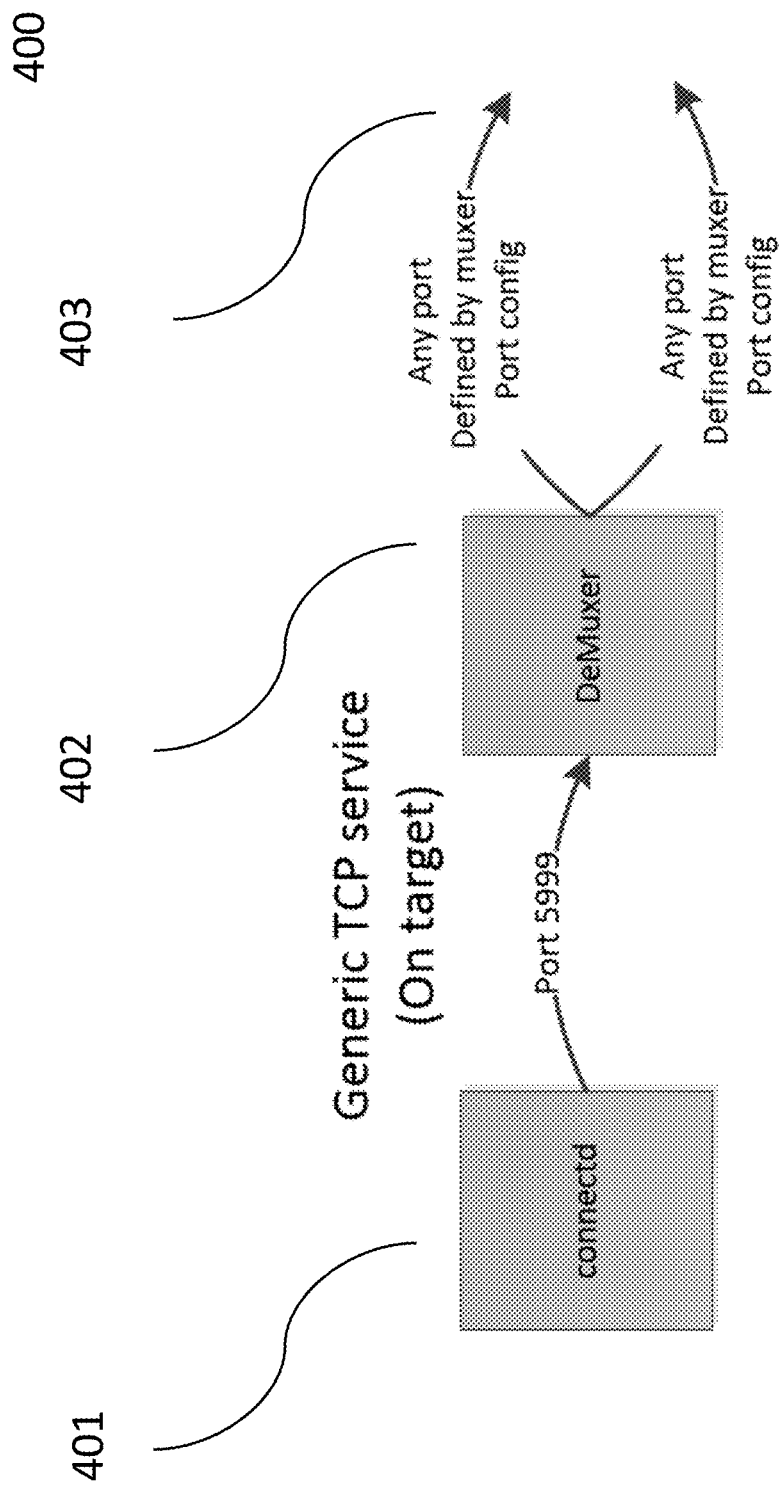

FIG. 4A shows a device 400 including a software daemon and demultiplexer with multiple output ports configured.

Figure 5A:
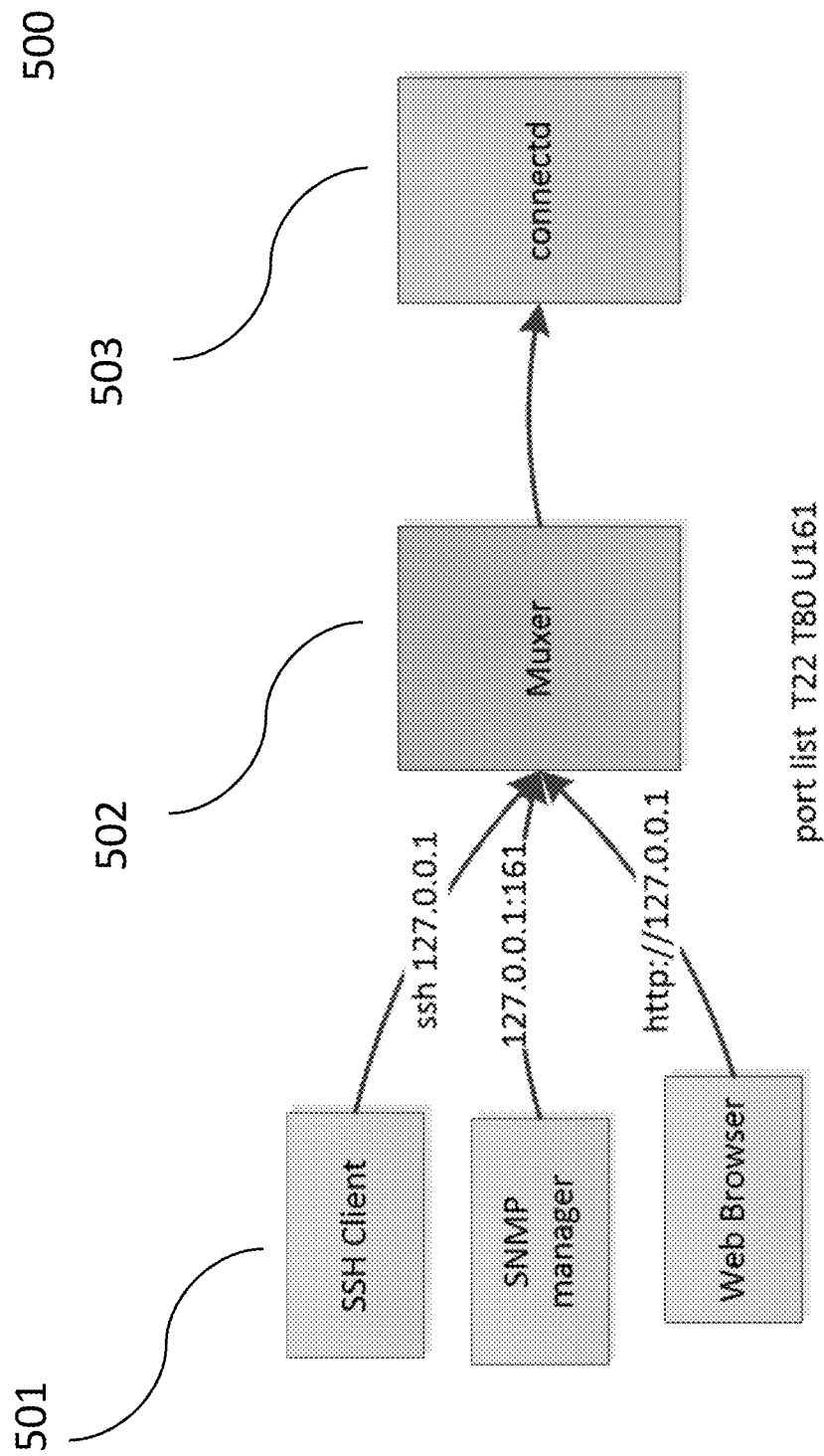

FIG. 5A shows a device 500 including a software daemon and multiplexer.

GLOSSARY

In this description a device refers to a mobile device, electronic system, machine, and/or any type of apparatus, system, that may be mobile, fixed, wearable, portable, integrated, cloud-based, distributed and/or any combination of these and which may be formed, manufactured, operated, etc. in any fashion, and/or manner in any location(s). It should be understood, however, that one or more of the embodiments described herein and/or in one or more specifications incorporated by reference may be applied to any device(s) or similar object(s) e.g., consumer devices, phones, phone systems, cell phones, cellular phones, mobile phone, smart phone, internet phones, smart watches, wireless phones, personal digital assistants (PDAs), remote communication devices, personal computers and peripherals, wireless devices, music players, video players, media players, multimedia players, video recorders, VCRs, DVRs, book readers, voice recorders, voice controlled systems, voice controllers, cameras, social interaction devices, radios, TVs, watches and other personal communication devices, electronic wallets, electronic currency, smart cards, smart credit cards, electronic money, electronic coins, electronic tokens, smart jewelry, electronic passports, electronic identification systems, biometric sensors, biometric systems, biometric devices, smart pens, smart rings, personal computers, tablets, laptop computers, scanners, printers, computers, web servers, media servers, multimedia servers, file servers, datacenter servers, database servers, database appliances, cloud servers, cloud devices, cloud appliances, embedded systems, embedded devices, electronic glasses, electronic goggles, electronic screens, displays, wearable displays, projectors, picture frames, touch screens, computer appliances, kitchen appliances, home appliances, restaurant equipment and appliances, home theater systems, audio systems, home control appliances, home control systems, irrigation systems, farming systems, farming controls, sprinkler systems, fire detection and control systems, garage door systems, garage door controls, remote controls, remote control systems, thermostats, heating systems, air conditioning systems, ventilation systems, climate control systems, climate monitoring systems, industrial control systems, transportation systems and controls, industrial process and control systems, industrial controller systems, machine-to-machine systems, aviation systems, locomotive systems, power control systems, power controllers, lighting control, lights, lighting systems, solar system controllers, solar panels, vehicle and other engines, engine controllers, motors, motor controllers, navigation controls, navigation systems, navigation displays, sensors, sensor systems, transducers, transducer systems, computer input devices, device controllers, touchpads, mouse, pointer, joystick, keyboards, game controllers, haptic devices, game consoles, game boxes, network devices, routers, switches, TIVO boxes, APPLETV devices, GOOGLETV devices, internet TV boxes, internet systems, internet devices, set-top boxes, cable boxes, modems, cable modems, cable systems, base-stations, base-station equipment, datacenter equipment, PCs, tablets, media boxes, streaming devices, entertainment centers, entertainment systems, aircraft entertainment systems, hotel entertainment systems, car and vehicle entertainment systems, GPS devices, GPS systems, automobile and other motor vehicle systems, truck systems, vehicle control systems, autonomous vehicle control systems, vehicle sensors, traffic sensors, traffic control systems, aircraft systems, ship systems and control, automation systems, home automation systems, industrial automation systems, reservation systems, check-in terminals, ticket collection systems, admission systems, payment devices, payment systems, banking machines, cash points, ATMs, vending machines, vending systems, point of sale devices, coin-operated devices, token operated devices, gas (petrol) pumps, dispensing systems, ticket machines, toll systems, barcode scanners, credit card scanners, travel token systems, travel card systems, RFID devices, electronic labels, electronic tags, tracking systems, electronic stickers, electronic price tags, near field communication (NFC) devices, wireless operated devices, wireless receivers, wireless transmitters, sensor devices, motes, sales terminals, checkout terminals, electronic toys, toy systems, gaming systems, information appliances, home speakers and terminals, information and other kiosks, sales displays, sales devices, electronic menus, coupon systems, shop displays, street displays, electronic advertising systems, traffic detection and control systems, traffic signs, parking systems, parking garage devices, elevators and elevator systems, building systems, HVAC control and monitoring systems, mailboxes, electronic signs, video cameras, security systems, surveillance systems, drones, alarms, electronic locks, electronic keys, electronic key fobs, access devices, access controls, electronic actuators, safety systems, smoke detectors, fire control systems, fire detection systems, locking devices, electronic safes, electronic doors, music devices, storage devices, back-up devices, USB keys, portable disks, exercise machines, sports equipment, medical devices, medical systems, personal medical devices, wearable medical devices, portable medical devices, mobile medical devices, blood pressure sensors, heart rate monitors, blood sugar monitors, vital sign monitors, ultrasound devices, medical imagers, drug delivery systems, drug monitoring systems, patient monitoring systems, medical records systems, industrial monitoring systems, robots, robotic devices, home robots, industrial robots, electric tools, power tools, construction equipment, electronic jewelry, wearable devices, wearable electronic devices, wearable sensors, wearable transducers, wearable cameras, wearable video cameras, wearable systems, electronic dispensing systems, handheld computing devices, handheld electronic devices, electronic clothing, combinations of these and/or any other devices, multi-function devices, multi-purpose devices, combination devices, cooperating devices, and the like, etc.

The devices may support (e.g., include, comprise, contain, implement, execute, be part of, be operable to execute, display, source, provide, store, etc.) one or more applications and/or functions e.g., search applications, contacts and/or friends applications, social interaction applications, social media applications, messaging applications, telephone applications, video conferencing applications, e-mail applications, voicemail applications, communications applications, voice recognition applications, instant messaging (IM) applications, texting applications, blog and/or blogging applications, photographic applications (e.g., catalog, management, upload, editing, etc.), shopping, advertising, sales, purchasing, selling, vending, ticketing, payment, digital camera applications, digital video camera applications, web browsing and browser applications, digital music player applications, digital video player applications, cloud applications, office productivity applications, database applications, cataloging applications, inventory control, medical applications, electronic book and newspaper applications, travel applications, dictionary and other reference work applications, language translation, spreadsheet applications, word processing applications, presentation applications, business applications, finance applications, accounting applications, publishing applications, web authoring applications, multimedia editing, computer-aided design (CAD), manufacturing applications, home automation and control, backup and/or storage applications, help and/or manuals, banking applications, stock trading applications, calendar applications, voice driven applications, map applications, consumer entertainment applications, games, other applications and/or combinations of these and/or multiple instances (e.g., versions, copies, etc.) of these and/or other applications, and the like, etc.

The devices may include (e.g., comprise, be capable of including, have features to include, have attachments, communicate with, be linked to, be coupled with, operable to be coupled with, be connected to, be operable to connect to, etc.) one or more devices (e.g., there may be a hierarchy of devices, nested devices, etc.). The devices may operate, function, run, etc. as separate components, working in cooperation, as a cooperative hive, as a confederation of devices, as a federation, as a collection of devices, as a cluster, as a multi-function device, with sockets, ports, connectivity, etc. for extra, additional, add-on, optional, etc. devices and/or components, attached devices (e.g., direct attach, network attached, remote attach, cloud attach, add on, plug in, etc.), upgrade components, helper devices, acceleration devices, support devices, engines, expansion devices and/or modules, combinations of these and/or other components, hardware, software, firmware, devices, and the like, etc.

The devices may have (e.g., comprise, include, execute, perform, capable of being programmed to perform, etc.) one or more device functions (e.g., telephone, video conferencing, e-mail, instant messaging, blogging, digital photography, digital video, web browsing, digital music playing, social interaction, shopping, searching, banking, combinations of these and/or other functions, and the like, etc.). Instructions, help, guides, manuals, procedures, algorithms, processes, methods, techniques, computer code, etc. for performing and/or helping to perform, etc. the device functions, etc. may be included in a non-transitory computer readable storage medium, computer readable memory medium, and/or other computer program product configured for execution, for example, by one or more processors.

The devices may include one or more processors (e.g., central processing units (CPUs), multicore CPUs, homogeneous CPUs, heterogeneous CPUs, graphics processing units (GPUs), computing arrays, CPU arrays, microprocessors, controllers, microcontrollers, engines, accelerators, compute arrays, programmable logic, DSP, combinations of these and the like, etc.). Devices and/or processors, etc. may include, contain, comprise, etc. one or more operating systems (OSs). Processors may use one or more machine or system architectures (e.g., ARM, Intel, x86, hybrids, emulators, other architectures, combinations of these, and the like, etc.).

Processor architectures may use one or more privilege levels. For example, the x86 architecture may include four hardware resource privilege levels or rings. The OS kernel, for example, may run in privilege level 0 or ring 0 with complete control over the machine or system. In the Linux OS, for example, ring 0 may be kernel space, and user mode may run in ring 3.

A multi-core processor (multicore processor, multicore CPU, etc.) may be a single computing component (e.g., a single chip, a single logical component, a single physical component, a single package, an integrated circuit, a multi-chip package, combinations of these and the like, etc.). A multicore processor may include (e.g., comprise, contain, etc.) two or more central processing units, etc. called cores. The cores may be independent, relatively independent and/or connected, coupled, integrated, logically connected, etc. in any way. The cores, for example, may be the units that read and execute program instructions. The instructions may be ordinary CPU instructions such as add, move data, and branch, but the multiple cores may run multiple instructions at the same time, increasing overall speed, for example, for programs amenable to parallel computing. Manufacturers may typically integrate the cores onto a single integrated circuit die (known as a chip multiprocessor or CMP), or onto multiple dies in a single chip package, but any implementation, construction, assembly, manufacture, packaging method and/or process, etc. is possible.

The devices may use one or more virtualization methods. In computing, virtualization refers to the act of creating (e.g., simulating, emulating, etc.) a virtual (rather than actual) version of something, including but not limited to a virtual computer hardware platform, operating system (OS), storage device, computer network resources and the like.

For example, a hypervisor or virtual machine monitor (VMM) may be a virtualization method and may allow (e.g., permit, implement, etc.) hardware virtualization. A hypervisor may run (e.g., execute, operate, control, etc.) one or more operating systems (e.g., guest OSs, etc.) simultaneously (e.g., concurrently, at the same time, at nearly the same time, in a time multiplexed fashion, etc.), and each may run on its own virtual machine (VM) on a host machine and/or host hardware (e.g., device, combination of devices, combinations of devices with other computer(s), etc.). A hypervisor, for example, may run at a higher level than a supervisor.

Multiple instances of OSs may share virtualized hardware resources. A hypervisor, for example, may present a virtual platform, architecture, design, etc. to a guest OS and may monitor the execution of one or more guest OSs. A Type 1 hypervisor (also type I, native, or bare metal hypervisor, etc.) may run directly on the host hardware to control the hardware and monitor guest OSs. A guest OS thus may run at a level above (e.g., logically above, etc.) a hypervisor. Examples of Type 1 hypervisors may include VMware ESXi, Citrix XenServer, Microsoft Hyper-V, etc. A Type 2 hypervisor (also type II, or hosted hypervisor) may run within a conventional OS (e.g., Linux, Windows, Apple iOS, etc.). A Type 2 hypervisor may run at a second level (e.g., logical level, etc.) above the hardware. Guest OSs may run at a third level above a Type 2 hypervisor. Examples of Type 2 hypervisors may include VMware Server, Linux KVM, VirtualBox, etc. A hypervisor thus may run one or more other hypervisors with their associated VMs. In some cases, virtualization and nested virtualization may be part of an OS. For example, Microsoft Windows 7 may run Windows XP in a VM. For example, the IBM turtles project, part of the Linux KVM hypervisor, may run multiple hypervisors (e.g., KVM and VMware, etc.) and operating systems (e.g., Linux and Windows, etc.). The term embedded hypervisor may refer to a form of hypervisor that may allow, for example, one or more applications to run above the embedded hypervisor without an OS.

The term hardware virtualization may refer to virtualization of machines, devices, computers, operating systems, combinations of these, etc. that may hide the physical aspects of a computer system and instead present (e.g., show, manifest, demonstrate, etc.) an abstract system (e.g., view, aspect, appearance, etc.). For example, x86 hardware virtualization may allow one or more OSs to share x86 processor resources in a secure, protected, safe, etc. manner. Initial versions of x86 hardware virtualization were implemented using software techniques to overcome the lack of processor virtualization support. Manufacturers (e.g., Intel, AMD, etc.) later added (e.g., in later generations, etc.) processor virtualization support to x86 processors, thus simplifying later versions of x86 virtualization software, etc. Continued addition of hardware virtualization features to x86 and other (e.g., ARM, etc.) processors has resulted in continued improvements (e.g., in speed, in performance, etc.) of hardware virtualization. Other virtualization methods, such as memory virtualization, I/O virtualization (IOV, etc.) may be performed by a chipset, integrated with a CPU, and/or by other hardware components, etc. For example, an input/output memory management unit (IOMMU) may enable guest VMs to access peripheral devices (e.g., network adapters, graphics cards, storage controllers, etc.) e.g., using DMA, interrupt remapping, etc. For example, PCI-SIG IOV may use a set of general (e.g., non-x86 specific) PCI Express (PCI-E) based native hardware I/O virtualization techniques. For example, one such technique may be address translation services (ATSs) that may support native IOV across PCI-E using address translation. For example, single root IOV (SR-IOV) may support native IOV in single root complex PCI-E topologies. For example, multi-root IOV (MR-IOV) may support native IOV by expanding SR-IOV to provide multiple root complexes that may, for example, share a common PCI-E hierarchy. In SR-IOV, for example, a host VMM may configure supported devices to create and allocate virtual shadows of configuration spaces (e.g., shadow devices, etc.) so that VM guests may, for example, configure, access, etc. one or more shadow device resources.

The devices (e.g., device software, device firmware, device applications, OSs, combinations of these, etc.) may use one or more programs (e.g., source code, programming languages, binary code, machine code, applications, apps, functions, etc.). The programs, etc. may use (e.g., require, employ, etc.) one or more code translation techniques (e.g., process, algorithms, etc.) to translate from one form of code to another form of code e.g., to translate from source code (e.g., readable text, abstract representations, high-level representations, graphical representations, etc.) to machine code (e.g., machine language, executable code, binary code, native code, low-level representations, etc.). For example, a compiler may translate (e.g., compile, transform, etc.) source code into object code (e.g., compiled code, etc.). For example, a linker may translate object code into machine code (e.g., linked code, loadable code, etc.). Machine code may be executed by a CPU, etc. at runtime. Computer programming languages (e.g., high-level programming languages, source code, abstract representations, etc.) may be interpreted or compiled. Interpreted code may be translated (e.g., interpreted, by an interpreter, etc.), for example, to machine code during execution (e.g., at runtime, continuously, etc.). Compiled code may be translated (compiled, by a compiler, etc.), for example, to machine code once (e.g., statically, at one time, etc.) before execution. An interpreter may be classified into one or more of the following types: type 1 interpreters may, for example, execute source code directly; type 2 interpreters may, for example, compile or translate source code into an intermediate representation (e.g., intermediate code, intermediate language, temporary form, etc.) and may execute the intermediate code; type 3 interpreters may execute stored precompiled code generated by a compiler that may, for example, be part of the interpreter. For example, languages such as Lisp, etc. may use a type 1 interpreter; languages such as Perl, Python, etc. may use a type 2 interpreter; languages such as Pascal, Java, etc. may use a type 3 interpreter. Some languages, such as Smalltalk, BASIC, etc. may, for example, combine facets, features, properties, etc. of interpreters of type 2 and interpreters of type 3. There may not always, for example, be a clear distinction between interpreters and compilers. For example, interpreters may also perform some translation. For example, some programming languages may be both compiled and interpreted or may include features of both. For example, a compiler may translate source code into an intermediate form (e.g., bytecode, portable code, p-code, intermediate code, etc.), that may then be passed to an interpreter. The terms interpreted language or compiled language applied to describing, classifying, etc. a programming language (e.g., C++ is a compiled programming language, etc.) may thus refer to an example (e.g., canonical, accepted, standard, theoretical, etc.) implementation of a programming language that may use an interpreter, compiler, etc. Thus a high-level computer programming language, for example, may be an abstract, ideal, theoretical, etc. representation that may be independent of a particular, specific, fixed, etc. implementation (e.g., independent of a compiled, interpreted version, etc.).

The devices (e.g., device software, device firmware, device applications, OSs, etc.) may use one or more alternative code forms, representations, etc. For example, a device may use bytecode that may be executed by an interpreter or that may be compiled. Bytecode may take any form. Bytecode, for example, may be based on (e.g., be similar to, use, etc.) hardware instructions and/or use hardware instructions in machine code. Bytecode design (e.g., format, architecture, syntax, appearance, semantics, etc.) may be based on a machine architecture (e.g., virtual stack machine, virtual register machine, etc.). Parts, portions, etc. of bytecode may be stored in files (e.g., modules, similar to object modules, etc.). Parts, portions, modules, etc. of bytecode may be dynamically loaded during execution. Intermediate code (e.g., bytecode, etc.) may be used to simplify and/or improve the performance, etc. of interpretation. Bytecode may be used, for example, in order to reduce hardware dependence, OS dependence, or other dependencies, etc. by allowing the same bytecode to run on different platforms (e.g., architectures, etc.). Bytecode may be directly executed on a VM (e.g., using an interpreter, etc.). Bytecode may be translated (e.g., compiled, etc.) to machine code, for example to improve performance, etc. Bytecode may include compact numeric codes, constants, references, numeric addresses, etc. that may encode the result of translation, parsing, semantic analysis, etc. of the types, scopes, nesting depths, etc. of program objects, constructs, structures, etc. The use of bytecode may, for example, allow improved performance over the direct interpretation of source code. Bytecode may be executed, for example, by parsing and executing bytecode instructions one instruction at a time. A bytecode interpreter may be portable (e.g., independent of device, machine architecture, computer system, computing platform, etc.).

The devices (e.g., device applications, OSs, etc.) may use one or more VMs. For example, a Java virtual machine (JVM) may use Java bytecode as intermediate code. Java bytecode may correspond, for example, to the instruction set of a stack-oriented architecture. For example, Oracle's JVM is called HotSpot. Examples of clean-room Java implementations may include Kaffe, IBM J9, and Dalvik. A software library (library) may be a collection of related object code. A class may be a unit of code. The Java Classloader may be part of the Java runtime environment (JRE) that may, for example, dynamically load Java classes into the JVM. Java libraries may be packaged in Jar files. Libraries may include objects of different types. One type of object in a Jar file may be a Java class. The class loader may locate libraries, read library contents, and load classes included within the libraries. Loading may, for example, be performed on demand, when the class is required by a program. Java may make use of external libraries (e.g., libraries written and provided by a third party, etc.). When a JVM is started, one or more of the following class loaders may be used: (1) bootstrap class loader; (2) extensions class loader; or (3) system class loader. The bootstrap class loader, which may be part of the core JVM, for example, may be written in native code and may load the core Java libraries. The extensions class loader may, for example, load code in the extensions directories. The system class loader may, for example, load code on the java.class.path stored in the system CLASSPATH variable. By default, all user classes may, for example, be loaded by the default system class loader that may be replaced by a user-defined ClassLoader. The Java class library may be a set of dynamically loadable libraries that Java applications may call at runtime. Because the Java platform may be independent of any OS, the Java platform may provide a set of standard class libraries that may, for example, include reusable functions commonly found in an OS. The Java class library may be almost entirely written in Java except, for example, for some parts that may need direct access to hardware, OS functions, etc. (e.g., for I/O, graphics, etc.). The Java classes that may provide access to these functions may, for example, use native interface wrappers, code fragments, etc. to access the API of the OS. Almost all of the Java class library may, for example, be stored in a Java archive file rt.jar, which may be provided with JRE and JDK distributions, for example.

The devices (e.g., device applications, OSs, etc.) may use one or more alternative code translation methods. For example, some code translation systems (e.g., dynamic translators, just-in-time compilers, etc.) may translate bytecode into machine language (e.g., native code, etc.) on demand, as required, etc. at runtime. Thus, for example, source code may be compiled and stored as machine independent code. The machine independent code may be linked at runtime and may, for example, be executed by an interpreter, compiler for JIT systems, etc. This type of translation, for example, may reduce portability, but may not reduce the portability of the bytecode itself. For example, programs may be stored in bytecode that may then be compiled using a JIT compiler that may translate bytecode to machine code. This may add a delay before a program runs and may, for example, improve execution speed relative to the direct interpretation of source code. Translation may, for example, be performed in one or more phases. For example, a first phase may compile source code to bytecode, and a second phase may translate the bytecode to a VM. There may be different VMs for different languages, representations, etc.

(e.g., for Java, Python, PHP, Forth, Tcl, etc.). For example, Dalvik bytecode designed for the Android platform, for example, may be executed by the Dalvik VM. For example, the Dalvik VM may use special representations (e.g., DEX, etc.) for storing applications. For example, the Dalvik VM may use its own instruction set (e.g., based on a register-based architecture rather than stack-based architecture, etc.) rather than standard JVM bytecode, etc. Other implementations may be used. For example, the implementation of Perl, Ruby, etc. may use an abstract syntax tree (AST) representation that may be derived from the source code. For example, ActionScript (an object-oriented language that may be a superset of JavaScript, a scripting language) may execute in an ActionScript virtual machine (AVM) that may be part of Flash Player and Adobe Integrated Runtime (AIR). ActionScript code, for example, may be transformed into bytecode by a compiler. ActionScript compilers may be used, for example, in Adobe Flash Professional and in Adobe Flash Builder and may be available as part of the Adobe Flex SDK. A JVM may contain both and interpreter and JIT compiler and switch from interpretation to compilation for frequently executed code. One form of JIT compiler may, for example, represent a hybrid approach between interpreted and compiled code, and translation may occur continuously (e.g., as with interpreted code, etc.), but caching of translated code may be used e.g., to increase speed, performance, etc. JIT compilation may also offer advantages over static compiled code, e.g., the use late-bound data types, the ability to use and enforce security constraints, etc. JIT compilation may, for example, combine bytecode compilation and dynamic compilation. JIT compilation may, for example, convert code at runtime prior to executing it natively e.g., by converting bytecode into native machine code, etc. Several runtime environments, (e.g., Microsoft .NET Framework, some implementations of Java, etc.) may, for example, use, employ, depend on, etc. JIT compilers. This specification may avoid the use of the term native machine code to avoid confusion with the terms machine code and native code.

The devices (e.g., device applications, OSs, etc.) may use one or more methods of emulation, simulation, etc. For example, binary translation may refer to the emulation of a first instruction set by a second instruction set (e.g., using code translation, etc.). For example, instructions may be translated from a source instruction set to a target instruction set. In some cases, such as instruction set simulation, the target instruction set may be the same as the source instruction set, and may, for example, provide testing features, debugging features, instruction trace, conditional breakpoints, hot spot detection, etc. Binary translation may be further divided into static binary translation and dynamic binary translation. Static binary translation may, for example, convert the code of an executable file to code that may run on a target architecture without, for example, having to run the code first. In dynamic binary translation, for example, the code may be run before conversion. In some cases conversion may not be direct since not all the code may be discoverable (e.g., reachable, etc.) by the translator. For example, parts of executable code may only be reached through indirect branches, with values, state, etc. needed for translation that may be known only at runtime. Dynamic binary translation may parse (e.g., process, read, etc.) a short sequence of code, may translate that code, and may cache the result of the translation. Other code may be translated as the code is discovered and/or when it is possible to be discovered. Branch instructions may point to already translated code and/or saved and/or cached (e.g., using memorization, etc.). Dynamic binary translation may differ from emulation and may eliminate the loop formed by the emulator reading, decoding, executing, etc. Binary translation may, for example, add a potential disadvantage of requiring additional translation overhead. The additional translation overhead may be reduced, ameliorated, etc. as translated code is repeated, executed multiple times, etc. For example, dynamic translators (e.g., Sun/Oracle HotSpot, etc.) may use dynamic recompilation, etc. to monitor translated code and aggressively (e.g., continuously, repeatedly, in an optimized fashion, etc.) optimize code that may be frequently executed, repeatedly executed, etc. This and other optimization techniques may be similar to that of a JIT compiler, and such compilers may be viewed as performing dynamic translation from a virtual instruction set (e.g., using bytecode, etc.) to a physical instruction set.

The term virtualization may refer to the creation (e.g., generation, design, etc.) of a virtual version (e.g., abstract version, apparent version, appearance of, illusion rather than actual, non-tangible object, etc.) of something (e.g., an object, tangible object, etc.) that may be real (e.g., tangible, non-abstract, physical, actual, etc.). For example, virtualization may apply to a device, mobile device, computer system, machine, server, hardware platform, platform, PC, tablet, operating system (OS), storage device, network resource, software, firmware, combinations of these and/or other objects, etc. For example, a VM may provide, present, etc. a virtual version of a real machine and may run (e.g., execute, etc.) a host OS, other software, etc. A VMM may be software (e.g., monitor, controller, supervisor, etc.) that may allow one or more VMs to run (e.g., be multiplexed, etc.) on one real machine. A hypervisor may be similar to a VMM. A hypervisor, for example, may be higher in functional hierarchy (e.g., logically, etc.) than a supervisor and may, for example, manage multiple supervisors (e.g., kernels, etc.). A domain (also logical domain, etc.) may run in (e.g., execute on, be loaded to, be joined with, etc.) a VM. The relationship between VMs and domains, for example, may be similar to that between programs and processes (or threads, etc.) in an OS. A VM may be a persistent (e.g., non-volatile, stored, permanent, etc.) entity that may reside (e.g., be stored, etc.) on disk and/or other storage, loaded into memory, etc. (e.g., and be analogous to a program, application, software, etc.). Each domain may have a domain identifier (also domain ID) that may be a unique identifier for a domain, and may be analogous (e.g., equivalent, etc.), for example, to a process ID in an OS. The term live migration may be a technique that may move a running (e.g., executing, live, operational, functional, etc.) VM to another physical host (e.g., machine, system, device, etc.) without stopping (e.g., halting, terminating, etc.) the VM and/or stopping any services, processes, threads, etc. that may be running on the VM.

Different types of hardware virtualization may include:

1. Full virtualization: Complete or almost complete simulation of actual hardware to allow software, which may comprise a guest operating system, to run unmodified. A VM may be (e.g., appear to be, etc.) identical (e.g., equivalent to, etc.) to the underlying hardware in full virtualization.

2. Partial virtualization: Some but not all of the target environment may be simulated. Some guest programs, therefore, may need modifications to run in this type of virtual environment.

3. Paravirtualization: A hardware environment is not necessarily simulated; however, the guest programs may be executed in their own isolated domains, as if they are running on a separate system. Guest programs may need to be specifically modified to run in this type of environment.

A VM may differ (e.g., in appearance, in functionality, in behavior, etc.) from the underlying (e.g., native, real, etc.) hardware in paravirtualization.

There may be other differences between these different types of hardware virtualization environments. Full virtualization may not require modifications (e.g., changes, alterations, etc.) to the host OS and may abstract (e.g., virtualize, hide, obscure, etc.) underlying hardware. Paravirtualization may also require modifications to the host OS in order to run in a VM. In full virtualization, for example, privileged instructions and/or other system operations, etc. may be handled by the hypervisor with other instructions running on native hardware. In paravirtualization, for example, code may be modified e.g., at compile-time, runtime, etc. For example, in paravirtualization privileged instructions may be removed, modified, etc. and, for example, replaced with calls to a hypervisor e.g., using APIs, hypercalls, etc. For example, Xen may be an example of an OS that may use paravirtualization, but may preserve binary compatibility for user-space applications, etc.

Virtualization may be applied to an entire OS and/or parts of an OS. For example, a kernel may be a main (e.g., basic, essential, key, etc.) software component of an OS. A kernel may form a bridge (e.g., link, coupling, layer, conduit, etc.) between applications (e.g., software, programs, etc.) and underlying hardware, firmware, software, etc. A kernel may, for example, manage, control, etc. one or more (including all) system resources e.g., CPUs, processors, I/O devices, interrupt controllers, timers, etc. A kernel may, for example, provide a low-level abstraction layer for the system resources that applications may control, manage, etc. A kernel running, for example, at the highest hardware privilege level may make system resources available to user-space applications through inter-process communication (IPC) mechanisms, system calls, etc. A microkernel, for example, may be a smaller (e.g., smaller than a kernel, etc.) OS software component. In a microkernel the majority of the kernel code may be implemented, for example, in a set of kernel servers (also just servers) that may communicate through a small kernel, using a small amount of code running in system (e.g., kernel, etc.) space and the majority of code in user space. A microkernel may, for example, comprise a simple (e.g., relative to a kernel, etc.) abstraction over (e.g., logically above, etc.) underlying hardware, with a set of primitives, system calls, other code, etc. that may implement basic (e.g., minimal, key, etc.) OS services (e.g., memory management, multitasking, IPC, etc.). Other OS services, (e.g., networking, storage drivers, high-level functions, etc.) may be implemented, for example, in one or more kernel servers. An exokernel may, for example, be similar to a microkernel but may provide a more hardware-like interface e.g., more direct interface, etc. For example, an exokernel may be similar to a paravirtualizing VMM (e.g., Xen, etc.), but an exokernel may be designed as a distinct and separate OS structure rather than to run multiple conventional OSs. A nanokernel may, for example, delegate (e.g., assign, etc.) virtually all services (e.g., including interrupt controllers, timers, etc.), for example, to device drivers. The term operating system-level virtualization (also OS virtualization, container, virtual private server (VPS), virtual environment (VE), jail, etc.) may refer to a server virtualization technique. In OS virtualization, for example, the kernel of an OS may allow (e.g., permit, enable, implement, etc.) one or more isolated user-space instances or containers. For example, a container may appear to be a real server from the view of a user. For example, a container may be based on standard Linux chroot techniques. In addition to isolation, a kernel may control (e.g., limit, stop, regulate, manage, prevent, etc.) interaction between containers.

Virtualization may be applied to one or more hardware components. For example, VMs may include one or more virtual components. The hardware components and/or virtual components may be inside (e.g., included within, part of, etc.) or outside (e.g., connected to, external to, etc.) a CPU, and may be part of or include parts of a memory system and/or subsystem, or may be any part or parts of a system, device, or may be any combinations of such parts and the like, etc. A memory page (also virtual page, or just page) may, for example, be a contiguous block of virtual memory of fixed-length that may be the smallest unit used for (e.g., granularity of, etc.) memory allocation performed by the OS e.g., for a program, etc. A page table may be a data structure, hardware component, etc. used, for example, by a virtual memory system in an OS to store the mapping from virtual addresses to physical addresses. A memory management unit (MMU) may, for example, store a cache of memory mappings from the OS page table in a translation lookaside buffer (TLB). A shadow page table may be a component that is used, for example, by a technique to abstract memory layout from a VM OS. For example, one or more shadow page tables may be used in a VMM to provide an abstraction of (e.g., an appearance of, a view of, etc.) contiguous physical memory. A CPU may include one or more CPU components, circuit, blocks, etc. that may include one or more of the following, but not limited to the following: caches, TLBs, MMUs, page tables, etc. at one or more levels (e.g., L1, L2, L3, etc.). A CPU may include one or more shadow copies of one or more CPU components, etc. One or more shadow page tables may be used, for example, during live migration. One or more virtual devices may include one or more physical system hardware components (e.g., CPU, memory, I/O devices, etc.) that may be virtualized (e.g., abstracted, etc.) by, for example, a hypervisor and presented to one or more domains. In this description the term virtual device, for example, may also apply to virtualization of a device (and/or part(s), portion(s) of a device, etc.) such as a mobile phone or other mobile device, electronic system, appliance, etc. A virtual device may, for example, also apply to (e.g., correspond to, represent, be equivalent to, etc.) virtualization of a collection, set, group, etc. of devices and/or other hardware components, etc.

Virtualization may be applied to I/O hardware, one or more I/O devices (e.g., storage devices, cameras, graphics cards, input devices, printers, network interface cards, etc.), I/O device resources, etc. For example, an IOMMU may be a MMU that connects one or more I/O devices on one or more I/O buses to the memory system. The IOMMU may, for example, map (e.g., translate, etc.) I/O device virtual addresses (e.g., device addresses, I/O addresses, etc.) to physical addresses. The IOMMU may also include memory protection (e.g., preventing and/or controlling unauthorized access to I/O devices, I/O device resources, etc.), one or more memory protection tables, etc. The IOMMU may, for example, also allow (e.g., control, manage, etc.) direct memory access (DMA) and allow (e.g., enable, etc.) one or more VMs, etc. to access DMA hardware.

Virtualization may be applied to software (e.g., applications, programs, etc.). For example, the term application virtualization may refer to techniques that may provide one or more application features. For example, application virtualization may isolate (e.g., protect, separate, divide, insulate, etc.) applications from the underlying OS and/or from other applications. Application virtualization may, for example, enable (e.g., allow, permit, etc.) applications to be copied (e.g., streamed, transferred, pulled, pushed, sent, distributed, etc.) from a source (e.g., centralized location, control center, datacenter server, cloud server, home PC, manufacturer, distributor, licensor, etc.) to one or more target devices (e.g., user devices, mobile devices, clients, etc.). For example, application virtualization may allow (e.g., permit, enable, etc.) the creation of an isolated (e.g., a protected, a safe, an insulated, etc.) environment on a target device. A virtualized application may not necessarily be installed in a conventional (e.g., usual, normal, etc.) manner. For example, a virtualized application (e.g., files, configuration, settings, etc.) may be copied (e.g., streamed, distributed, etc.) to a target (e.g., destination, etc.) device rather than being installed, etc. The execution of a virtualized application at runtime may, for example, be controlled by an application virtualization layer. A virtualized application may, for example, appear to interface directly with the OS, but may actually interface with the virtualization environment. For example, the virtualization environment may proxy (e.g., intercept, forward, manage, control, etc.) one or more (including all) OS requests. The term application streaming may refer, for example, to virtualized application techniques that may use pieces (e.g., parts, portions, etc.) of one or more applications (e.g., code, data, settings, etc.) that may be copied (e.g., streamed, transferred, downloaded, uploaded, moved, pushed, pulled, etc.) to a target device. A software collection (e.g., set, distribution, distro, bundle, package, etc.) may, for example, be a set of software components built, assembled, configured, and ready for use, execution, installation, etc. Applications may be streamed, for example, as one or more collections. Application streaming may, for example, be performed on demand (e.g., as required, etc.) instead of copying or installing an entire application before startup. In some cases a streamed application may, for example, require the installation of a lightweight application on a target device. A streamed application and/or application collections may, for example, be delivered using one or more networking protocols (e.g., HTTP, HTTPS, CIFS, SMB, RTSP, etc.). The term desktop virtualization (also virtual desktop infrastructure (VDI), etc.) may refer, for example, to an application that may be hosted in a VM (or blade PC, appliance, etc.) and that may also include an OS. VDI techniques may, for example, include control of (e.g., management infrastructure for, automated creation of, etc.) one or more virtual desktops. The term session virtualization may refer, for example, to techniques that may use application streaming to deliver applications to one or more hosting servers (e.g., in a remote datacenter, cloud server, cloud service, etc.). The application may then, for example, execute on the hosting server(s). A user may then, for example, connect to (e.g., login, access, etc.) the application, hosting server(s), etc. The user and/or user device may, for example, send input (e.g., mouse-click, keystroke, mouse or other pointer location, audio, video, location, sensor data, control data, combinations of these and/or other data, information, user input, etc.) to the application e.g., on the hosting server(s), etc. The hosting server(s) may, for example, respond by sending output (e.g., screen updates, text, video, audio, signals, code, data, information, etc.) to the user device. A sandbox may, for example, isolate (e.g., insulate, separate, divide, etc.) one or more applications, programs, software, etc. For example, an OS may place an application (e.g., code, preferences, configuration, data, etc.) in a sandbox (e.g., at install time, at boot, or any time). A sandbox may, for example, include controls that may limit the application access (e.g., to files, preferences, network, hardware, firmware, other applications, etc.). As part of the sandbox process, technique, etc. an OS may, for example, install one or more applications in one or more separate sandbox directories (e.g., repositories, storage locations, etc.) that may store the application, application data, configuration data, settings, preferences, files, and/or other information, etc.

Devices may, for example, be protected from accidental faults (e.g., programming errors, bugs, data corruption, hardware faults, network faults, link faults, etc.) or malicious (e.g., deliberate, etc.) attacks (e.g., virus, malware, denial of service attacks, root kits, etc.) by various security, safety, protection mechanisms, etc. For example, CPUs, etc. may include one or more protection rings (or just rings, also hierarchical protection domains, domains, privilege levels, etc.). A protection ring may, for example, include one or more hierarchical levels (e.g., logical layers, etc.) of privilege (e.g., access rights, permissions, gating, etc.). For example, an OS may run (e.g., execute, operate, etc.) in a protection ring. Different protection rings may provide different levels of access (e.g., for programs, applications, etc.) to resources (e.g., hardware, memory, etc.). Rings may be arranged in a hierarchy ranging from the most privileged ring (e.g., most trusted ring, highest ring, inner ring, etc.) to the least privileged ring (e.g., least trusted ring, lowest ring, outer ring, etc.). For example, ring 0 may be a ring that may interact most directly with the real hardware (e.g., CPU, memory, I/O devices, etc.). For example, in a machine without virtualization, ring 0 may contain the OS, kernel, etc.; ring 1 and ring 2 may contain device drivers, etc.; ring 3 may contain user applications, programs, etc. For example, ring 1 may correspond to kernel space (e.g., kernel mode, master mode, supervisor mode, privileged mode, supervisor state, etc.). For example, ring 3 may correspond to user space (e.g., user mode, user state, slave mode, problem state, etc.). There is no fundamental restriction to the use of rings and, in general, any ring may correspond to any type of space, etc.

One or more gates (e.g., hardware gates, controls, call instructions, other hardware and/or software techniques, etc.) may be logically located (e.g., placed, situated, etc.) between rings to control (e.g., gate, secure, manage, etc.) communication, access, resources, transition, etc. between rings e.g., gate the access of an outer ring to resources of an inner ring, etc. For example, there may be gates or call instructions that may transfer control (e.g., may transition, exchange, etc.) to defined entry points in lower-level rings. For example, gating communication or transitions between rings may prevent programs in a first ring from misusing resources of programs in a second ring. For example, software running in ring 3 may be gated from controlling hardware that may only be controlled by device drivers running in ring 1. For example, software running in ring 3 may be required to request access to network resources that may be gated to software running in ring 1.

One or more coupled devices may form a collection, federation, confederation, assembly, set, group, cluster, etc. of devices. A collection of devices may perform operations, processing, computation, functions, etc. in a distributed fashion, manner, etc. In a collection, etc. of devices that may perform distributed processing, it may be important to control the order of execution, how updates are made to files and/or databases, and/or other aspects of collective computation, etc. One or more models, frameworks, etc. may describe, define, etc. the use of operations, etc. and may use a set of definitions, rules, syntax, semantics, etc. using the concepts of transactions, tasks, composable tasks, noncomposable tasks, etc.

For example, a bank account transfer operation (e.g., a type of transaction, etc.) might be decomposed (e.g., broken, separated, etc.) into the following steps: withdraw funds from a first account one and deposit funds into a second account.

The transfer operation may be atomic. For example, if either step one fails or step two fails (or a computer crashes between step one and step two, etc.) the entire transfer operation should fail. There should be no possibility (e.g., state, etc.) that the funds are withdrawn from the first account but not deposited into the second account.

The transfer operation may be consistent. For example, after the transfer operation succeeds, any other subsequent transaction should see the results of the transfer operation.

The transfer operation may be isolated. For example, if another transaction tries to simultaneously perform an operation on either the first or second accounts, what they do to those accounts should not affect the outcome of the transfer option.

The transfer operation may be durable. For example, after the transfer operation succeeds, if a computer should fail, etc., there may be a record that the transfer took place.

The terms tasks, transactions, composable, noncomposable, etc. may have different meanings in different contexts (e.g., with different uses, in different applications, etc.). One set of frameworks (e.g., systems, applications, etc.) that may be used, for example, for transaction processing, database processing, etc. may be languages (e.g., computer languages, programming languages, etc.) such as structured transaction definition language (STDL), structured query language (SQL), etc.

For example, a transaction may be a set of operations, actions, etc. to files, databases, etc. that must take place as a set, group, etc. For example, operations may include read, write, add, delete, etc. All the operations in the set must complete or all operations may be reversed. Reversing the effects of a set of operations may roll back the transaction. If the transaction completes, the transaction may be committed. After a transaction is committed, the results of the set of operations may be available to other transactions.

For example, a task may be a procedure that may control execution flow, delimit or demarcate transactions, handle exceptions, and may call procedures to perform, for example, processing functions, computation, access files, access databases (e.g., processing procedures) or obtain input, provide output (e.g., presentation procedures).

For example, a composable task may execute within a transaction. For example, a noncomposable task may demarcate (e.g., delimit, set the boundaries for, etc.) the beginning and end of a transaction. A composable task may execute within a transaction started by a noncomposable task. Therefore, the composable task may always be part of another task's work. Calling a composable task may be similar to calling a processing procedure, e.g., based on a call and return model. Execution of the calling task may continue only when the called task completes. Control may pass to the called task (possibly with parameters, etc.) and then control may return to the calling task. The composable task may always be part of another task's transaction. A noncomposable task may call a composable task and both tasks may be located on different devices. In this case, their transaction may be a distributed transaction. There may be no logical distinction between a distributed and nondistributed transaction.

Transactions may compose. For example, the process of composition may take separate transactions and add them together to create a larger single transaction. A composable system, for example, may be a system whose component parts do not interfere with each other.

For example, a distributed car reservation system may access remote databases by calling composable tasks in remote task servers. For example, a reservation task at a rental site may call a task at the central site to store customer data in the central site rental database. The reservation task may call another task at the central site to store reservation data in the central site rental database and the history database.

The use of composable tasks may enable a library of common functions to be implemented as tasks. For example, applications may require similar processing steps, operations, etc. to be performed at multiple stages, points, etc. For example, applications may require one or more tasks to perform the same processing function. Using a library, for example, common functions may be called from multiple points within a task or from different tasks.

A uniform resource locator (URL) is a uniform resource identifier (URI) that specifies where a known resource is available and the mechanism for retrieving it. A URL comprises the following: the scheme name (also called protocol, e.g., http, https, etc.), a colon (":"), a domain name (or IP address), a port number, and the path of the resource to be fetched. The syntax of a URL is scheme://domain:port/path.

HTTP is the hypertext transfer protocol.

HTTPS is the hypertext transfer protocol secure (HTTPS) and is a combination of the HTTP with the SSL/TLS protocol to provide encrypted communication and secure identification.

A session is a sequence of network request-response transactions.

An IP address is a binary number assigned to a device on an IP network (e.g., 172.16.254.1) and can be formatted as a 32-bit dot-decimal notation (e.g., for IPv4) or in a notation to represent 128-bits, such as "2001:db8:0:1234:0:567:8:1" (e.g., for IPv6).

A domain name comprises one or more concatenated labels delimited by dots (periods), e.g., "en.wikipedia.org". The domain name "en.wikipedia.org" includes labels "en" (the leaf domain), "wikipedia" (the second-level domain), and "org" (the top-level domain).

A hostname is a domain name that has at least one IP address. A hostname is used to identify a device (e.g., in an IP network, on the World Wide Web, in an e-mail header, etc.). Note that all hostnames are domain names, but not all domain names are hostnames. For example, both en.wikipedia.org and wikipedia.org are hostnames if they both have IP addresses assigned to them. The domain name xyz.wikipedia.org is not a hostname if it does not have an IP address, but aa.xyz.wikipedia.org is a hostname if it does have an IP address.

A domain name comprises one or more parts, the labels that are concatenated, being delimited by dots such as "example.com". Such a concatenated domain name represents a hierarchy. The right-most label conveys the top-level domain; for example, the domain name www.example.com belongs to the top-level domain com. The hierarchy of domains descends from the right to the left label in the name; each label to the left specifies a subdivision, or subdomain of the domain to the right. For example, the label example specifies a node example.com as a subdomain of the corn domain, and www is a label to create www.example.com, a subdomain of example.com.

The DHCP is the dynamic host configuration protocol (described in RFC 1531 and RFC 2131) and is an automatic configuration protocol for IP networks. When a DHCP-configured device (DHCP client) connects to a network, the DHCP client sends a broadcast query requesting an IP address from a DHCP server that maintains a pool of IP addresses. The DHCP server assigns the DHCP client an IP address and lease (the length of time the IP address is valid).

A media access control address (MAC address, also Ethernet hardware address (EHA), hardware address, physical address) is a unique identifier (e.g., 00-B0-D0-86-BB-F7) assigned to a network interface (e.g., address of a network interface card (NIC), etc.) for communications on a physical network (e.g., Ethernet).

A trusted path (and thus trusted user, and/or trusted device, etc.) is a mechanism that provides confidence that a user is communicating with what the user intended to communicate with, ensuring that attackers cannot intercept or modify the information being communicated.

A proxy server (also proxy) is a server that acts as an intermediary (e.g., gateway, go-between, helper, relay, etc.) for requests from clients seeking resources from other servers. A client connects to the proxy server, requesting a service (e.g., file, connection, web page, or other resource, etc.) available from a different server, the origin server. The proxy server provides the resource by connecting to the origin server and requesting the service on behalf of the client. A proxy server may alter the client request or the server response.

A forward proxy located in an internal network receives requests from users inside an internal network and forwards the requests to the Internet outside the internal network. A forward proxy typically acts a gateway for a client browser (e.g., user, client, etc.) on an internal network and sends HTTP requests on behalf of the client browser to the Internet. The forward proxy protects the internal network by hiding the client IP address by using the forward proxy IP address. The external HTTP server on the Internet sees requests originating from the forward proxy rather than the client.

A reverse proxy (also origin-side proxy, server-side proxy) located in an internal network receives requests from Internet users outside the internal network and forwards the requests to origin servers in the internal network. Users connect to the reverse proxy and may not be aware of the internal network. A reverse proxy on an internal network typically acts as a gateway to an HTTP server on the internal network by acting as the final IP address for requests from clients that are outside the internal network. A firewall is typically used with the reverse proxy to ensure that only the reverse proxy can access the HTTP servers behind the reverse proxy. The external client sees the reverse proxy as the HTTP server.

An open proxy forwards requests to and from anywhere on the Internet.

In network computing, the term demilitarized zone (DMZ, also perimeter network), is used to describe a network (e.g., physical network, logical subnetwork, etc.) exposed to a larger untrusted network (e.g., Internet, cloud, etc.). A DMZ may, for example, expose external services (e.g., of an organization, company, device, etc.). One function of a DMZ is to add an additional layer of security to a local area network (LAN). In the event of an external attack, the attacker only has access to resources (e.g., equipment, server(s), router(s), etc.) in the DMZ.

In the HTTP protocol a redirect is a response (containing header, status code, message body, etc.) to a request (e.g., GET, etc.) that directs a client (e.g., browser, etc.) to go to another location (e.g., site, URL, etc.).

A localhost (as described, for example, in RFC 2606) is the hostname given to the address of the loopback interface (also virtual loopback interface, loopback network interface, loopback device, network loopback), referring to "this computer". For example, directing a browser on a computer running an HTTP server to a loopback address (e.g., http://localhost, http://127.0.0.1, etc.) may display the website of the computer (assuming a web server is running on the computer and is properly configured). Using a loopback address allows connection to any locally hosted network service (e.g., computer game server, or other inter-process communications, etc.).

The localhost hostname corresponds to an IPv4 address in the 127.0.0.0/8 net block i.e., 127.0.0.1 (for IPv4, see RFC 3330) or:1 (for IPv6, see RFC 3513). The most common IP address for the loopback interface is 127.0.0.1 for IPv4, but any address in the range 127.0.0.0 to 127.255.255.255 maps to the loopback device. The routing table of an operating system (OS) may contain an entry so that traffic (e.g., packet, network traffic, IP datagram, etc.) with destination IP address set to a loopback address (the loopback destination address) is routed internally to the loopback interface. In the TCP/IP stack of an OS the loopback interface is typically contained in software (and not connected to any network hardware).

An Internet socket (also network socket or just socket) is an endpoint of a bidirectional inter-process communication (IPC) flow across a network (e.g., IP-based computer network such as the Internet, etc.). The term socket is also used for the API for the TCP/IP protocol stack. Sockets provide the mechanism to deliver incoming data packets to a process (e.g., application, program, application process, thread, etc.), based on a combination of local (also source) IP address, local port number, remote (also destination) IP address, and remote port number. Each socket is mapped by the OS to a process. A socket address is the combination of an IP address and a port number.

Communication between server and client (which are types of endpoints) may use a socket. Communicating local and remote sockets are socket pairs. A socket pair is described by a unique 4-tuple (e.g., four numbers, four sets of numbers, etc.) of source IP address, destination IP address, source port number, destination port number, (e.g., local and remote socket addresses). For TCP, each socket pair is assigned a unique socket number. For UDP, each local socket address is assigned a unique socket number.

A computer program may be described using one or more function calls (e.g., macros, subroutines, routines, processes, etc.) written as function_name ( ), where function_name is the name of the function. The process (e.g., a computer program, etc.) by which a local server establishes a TCP socket may include (but is not limited to) the following steps and functions:

1. socket( ) creates a new local socket.
2. bind( ) associates (e.g., binds, links, ties, etc.) the local socket with a local socket address i.e., a local port number and IP address (the socket and port are thus bound to a software application running on the server).
3. listen( ) causes a bound local socket to enter the listen state.

A remote client then establishes connections with the following steps:

1. socket( ) creates a new remote socket.
2. connect( ) assigns a free local port number to the remote socket and attempts to establishes a new connection with the local server.

The local server then establishes the new connection with the following step:

1. accept( ) accepts the request to create a new connection from the remote client.

A client and server may now communicate using send( ) and receive ( ).

An abstraction of the architecture of the World Wide Web is representational state transfer (REST). The REST architectural style was developed by the W3C Technical Architecture Group (TAG) in parallel with HTTP 1.1, based on the existing design of HTTP 1.0 The World Wide Web represents the largest implementation of a system conforming to the REST architectural style. A REST architectural style may consist of a set of constraints applied to components, connectors, and data elements, e.g., within a distributed hypermedia system. REST ignores the details of component implementation and protocol syntax in order to focus on the roles of components, the constraints upon their interaction with other components, and their interpretation of significant data elements. REST may be used to describe desired web architecture, to identify existing problems, to compare alternative solutions, and to ensure that protocol extensions do not violate the core constraints of the web. The REST architectural style may also be applied to the development of web services as an alternative to other distributed-computing specifications such as SOAP.

The REST architectural style describes six constraints: (1) Uniform Interface. The uniform interface constraint defines the interface between clients and servers. It simplifies and decouples the architecture, which enables each part to evolve independently. The uniform interface that any REST services must provide is fundamental to its design. The four principles of the uniform interface are: (1.1) Resource-Based. Individual resources are identified in requests using URIs as resource identifiers. The resources themselves are conceptually separate from the representations that are returned to the client. For example, the server does not send its database, but rather, some HTML, XML or JSON that represents some database records expressed, for instance, in Finnish and encoded in UTF-8, depending on the details of the request and the server implementation.

Networking Issues

This section describes some of the issues involved in the networking, deployment and management of a large number of networked devices.

Network address translation (NAT) is a method to map a first IP address space into a second IP address space by modifying network address information (e.g. one or more of IP address, port, etc.) in Internet Protocol (IP) datagram packet headers while packets are in transit across a traffic routing device (router, switch, server, device, etc.). A NAT, e.g. a device using one or more forms of NAT etc., is similar to a private phone system at an office that has one public telephone number and multiple private extensions. Outbound phone calls made from the office all appear to come from the same telephone number. However, an incoming call that does not specify an extension cannot be transferred to an individual inside the office. Every TCP and UDP packet contains a source IP address and source port number as well as a destination IP address and destination port number. The IP address/port number pair forms a socket. In particular, the source IP address and source port number form the source socket. For publicly accessible services such as web servers and mail servers the port number is important. For example, port 80 connects to the web server software and port 25 to a mail server's SMTP daemon. The IP address of a public server is also important, similar in global uniqueness to a postal address or telephone number. Both IP address and port number must be correctly known by all hosts wishing to successfully communicate. Using again the analogy of the private office telephone system: the office system corresponds to a private LAN, the main phone number is the public IP address, and the individual extensions are unique port numbers. NAT was originally used for ease of rerouting traffic in IP networks without renumbering every host. NAT is now widely used and an essential tool in conserving global address space allocations in face of IPv4 address exhaustion. When a device (first computer, first server, etc.) on a private (e.g. internal, corporate, etc.) network sends an IPv4 packet to an external (e.g. public, routable, etc.) network, the NAT device (e.g. second device, second computer, second server, etc.) replaces the internal IP address in the source field of the packet header (i.e. the sender's address) with the external IP address of the NAT device. Port Address Translation (PAT), which is one form of NAT, may then assign the connection a port number from a pool of available ports, inserting this port number in the source port field (much like a post office box number), and forwards the packet to the external network. The NAT device then makes an entry in a translation table containing the internal IP address, original source port, and the translated source port. Subsequent packets from the same connection are translated to the same port number. The device receiving a packet that has undergone NAT establishes a connection to the port and IP address specified in the altered packet, oblivious to the fact that the supplied address is being translated (analogous to using a post office box number). A packet coming from the external network is mapped to a corresponding internal IP address and port number from the translation table, replacing the external IP address and port number in the incoming packet header (similar to the translation from a post office box number to a street address). The packet is then forwarded over the inside network. Otherwise, if the destination port number of the incoming packet is not found in the translation table, the packet is dropped or rejected because the PAT device doesn't know where to send it. NAT only translates IP addresses and ports of its internal hosts, hiding the true endpoint of an internal host on a private network.

A session is defined as the set of traffic e.g. that is managed as a unit for translation. TCP and UDP sessions are uniquely identified by the tuple of (source IP address, source TCP/UDP port, target IP address, target TCP/UDP port). ICMP query sessions are identified by the tuple of (source IP address, ICMP query ID, target IP address). All other sessions are characterized by the tuple of (source IP address, target IP address, IP protocol). A session flow indicates the direction in which a session was initiated with reference to a network interface. A packet flow is the direction in which a packet has traveled with reference to a network interface.

A global network (or public network, also external network, e.g. internet, etc.) is an address realm (or address space) with unique network addresses assigned by Internet Assigned Numbers Authority (IANA) or an equivalent address registry. A private network (or private internet, also Local Network, Local Area Network, private LAN, LAN, etc.) is an address realm independent of external network addresses. IANA has three blocks of IP address space, namely 10/8 (e.g. single class A network), 172.16/12 (16 contiguous class B networks), and 192.168/16 (256 contiguous class C networks) set aside for private internets.

Types of NAT include: traditional NAT (or outbound NAT) with unidirectional sessions, outbound from the private network, including basic NAT (address translation) and Network Address Port Translation (NAPT); bi-directional NAT (or two-way NAT) with sessions initiated from hosts in the public network and the private network; twice NAT with mapping of both source and destination addresses c.f. traditional NAT etc. where only one addresses (source or destination) is translated (e.g. used when private and external realms have address collisions e.g., a site improperly numbers its internal nodes using public addresses assigned to another organization.); multihomed NAT with multiple NAT devices or multiple links on the same NAT device; full-cone NAT, also known as one-to-one NAT, where an internal address (iAddr:iPort) is mapped to an external address (eAddr:ePort), any packets from iAddr:iPort are sent through eAddr:ePort, and any external host can send packets to iAddr:iPort by sending packets to eAddr:ePort; (address)-restricted-cone NAT, where an internal address (iAddr:iPort) is mapped to an external address (eAddr:ePort), any packets from iAddr:iPort are sent through eAddr:ePort, and an external host (hAddr:any) can send packets to iAddr:iPort by sending packets to eAddr:ePort only if iAddr:iPort has previously sent a packet to hAddr:any (where 'any' means any port number); port-restricted cone NAT (similar to address restricted cone NAT, but the restriction includes port numbers) where an internal address (iAddr:iPort) is mapped to an external address (eAddr:ePort), any packets from iAddr:iPort are sent through eAddr:ePort, and an external host (hAddr:hPort) can send packets to iAddr:iPort by sending packets to eAddr:ePort only if iAddr:iPort has previously sent a packet to hAddr:hPort; symmetric NAT where each request from the same internal IP address and port to a specific destination IP address and port is mapped to a unique external source IP address and port; if the same internal host sends a packet even with the same source address and port but to a different destination, a different mapping is used and only an external host that receives a packet from an internal host can send a packet back.

Carrier-grade NAT (CGN), also known as large-scale NAT (LSN), is an configures end sites, e.g. residential networks, with private network addresses that are translated to public IPv4 addresses by middlebox NAT devices embedded in a network operator's network, thus permitting the sharing of pools of public addresses among many end sites and shifting the NAT function and configuration from customer premise to an Internet Service Provider (ISP) network.

The terms local endpoint, internal endpoint denote the local IP:port as seen locally by the host and the internal part of the NAT. The terms public endpoint, external endpoint denote the external IP:port mapped by the NAT, as seen by the network and the external part of the NAT. The term remote endpoint denotes the IP:port of the other peer as seen by the network, or the external parts of both NATs.

Hole punching is a technique to establish a direct connection between two parties in which one or both are behind restrictive firewalls, or behind routers that use NAT. To perform hole punching, each client connects to an unrestricted third-party server (e.g. proxy server, relay server, etc.) that temporarily stores external and internal address and port information for each client. The server then relays each client's information to the other one, and using that information both clients try to establish a connection between themselves; as a result of the connections using valid port numbers, restrictive firewalls or routers accept and forward the incoming packets on each side.

Session Traversal Utilities for NAT (STUN) is a standardized set of methods and a network protocol to allow an end host to discover its public IP address if it is located behind a NAT. STUN is used to permit NAT traversal for applications of real-time voice, video, messaging, and other interactive IP communications. STUN is intended to be a tool to be used by other protocols, such as ICE. The STUN protocol allows applications operating behind NAT to discover the presence of the NAT and to obtain the mapped (public) IP address (NAT address) and port number that the NAT has allocated for the application's UDP connections to remote hosts. STUN requires assistance from a third-party network server (STUN server) located on the opposing (public) side of the NAT, usually the public Internet.

Interactive Connectivity Establishment (ICE) provides a framework with which a communicating peer may discover and communicate its public IP address so that it can be reached by other peers. ICE is a protocol for NAT traversal for UDP-based multimedia sessions established with the offer/answer model. ICE makes use of the STUN protocol and its extension TURN. ICE can be used by any protocol utilizing the offer/answer model, such as the Session Initiation Protocol (SIP).

If a host is located behind a NAT, then in certain situations it may be impossible for that host to communicate directly with other hosts (peers). In these situations, it is necessary for the host to use the services of an intermediate node that acts as a communication relay. Traversal Using Relays around NAT (TURN) is a protocol that allows the host to control the operation of the relay and to exchange packets with its peers using the relay. TURN allows a client to communicate with multiple peers using a single relay address. The TURN protocol was designed to be used as part of the ICE approach to NAT traversal, though it also can be used without ICE.

Many NAT implementations follow port preservation for TCP: for a given outgoing TCP communication, they use the same values as internal and external port numbers. NAT port preservation for outgoing TCP connections is crucial for TCP NAT traversal, because as TCP requires that one port can only be used for one communication at a time, programs bind distinct TCP sockets to ephemeral ports for each TCP communication, rendering NAT port prediction impossible for TCP. For UDP, NATs do not need port preservation. Multiple UDP communications (each with a distinct endpoint) can occur on the same source port, and applications usually reuse the same UDP socket to send packets to distinct hosts. This makes port prediction straightforward, as it is the same source port for each packet. Port preservation in NAT for TCP allows P2P protocols to offer less complexity and less latency because there is no need to use a third party (such as STUN) to discover the NAT port since the application itself already knows the NAT port. If two internal hosts attempt to communicate with the same external host using the same port number, the external port number used by the second host is chosen at random. Such NAT is sometimes perceived as restricted cone NAT (or address restricted cone NAT, also as symmetric NAT).

Port forwarding or port mapping is an example of NAT that redirects a communication request from one address and port number combination to another while the packets are traversing a network gateway, such as a router or firewall. This technique is most commonly used to make services on a host residing on a protected or masqueraded (internal) network available to hosts on the opposite side of the gateway (external network), by remapping the destination IP address and port number of the communication to an internal host. Port forwarding allows remote computers (e.g. computers on the Internet) to connect to a specific computer or service within a private LAN. Types of port forwarding include: local port forwarding; remote port forwarding; and dynamic port forwarding (DPF), which is an on-demand method of traversing a firewall or NAT through the use of firewall pinholes.

NAT traversal is a method to establish IP connections across devices (e.g. gateways, routers, servers, etc.) that implement NAT. NAT breaks the principle of end-to-end connectivity originally envisioned in the design of the Internet. NAT traversal techniques may required for certain client-to-client (e.g. peer to peer etc.) network applications, such as peer-to-peer file sharing and Voice over IP (VOIP). Many NAT traversal techniques exist, but no single method works in every situation since NAT behavior is not standardized. Many NAT traversal techniques require assistance from a server at a publicly routable IP address (e.g. proxy server, relay server, etc.). Some NAT traversal methods use the server only when establishing the connection, while others are based on relaying all data through it, which adds bandwidth costs and increases latency, detrimental to real-time voice and video communications. Most NAT traversal techniques bypass enterprise security policies. IETF standards based on this security model are Realm-Specific IP (RSIP) and middlebox communications (MIDCOM). The use of symmetric NATs has reduced NAT traversal success rates in many practical situations such as mobile and public WiFi internet connections. Hole punching techniques such as STUN and ICE are unable to traverse symmetric NATs without the help of a relay server (e.g. TURN). Port prediction techniques are only effective with NAT devices that use known deterministic algorithms for port selection. This predictable yet non-static port allocation scheme is uncommon in large scale NATs such as those used in 4G LTE networks.

Manipulation of Resources Through Representations

When a client holds a representation of a resource, including any metadata attached, it has enough information to modify or delete the resource on the server, provided it has permission to do so. (1.3) Self-descriptive Messages. Each message includes enough information to describe how to process the message. For example, which parser to invoke may be specified by an Internet media type (previously known as a MIME type). Responses also explicitly indicate their cache-ability. (1.4) Hypermedia as the Engine of Application State (HATEOAS). Clients deliver state via body contents, query-string parameters, request headers and the requested URI (the resource name). Services deliver state to clients via body content, response codes, and response headers. This is technically referred to as hypermedia (or hyperlinks within hypertext). HATEOAS also means that, where necessary, links are contained in the returned body (or headers) to supply the URI for retrieval of the object itself or related objects. (2) Stateless. The necessary state to handle the request is contained within the request itself, whether as part of the URI, query-string parameters, body, or headers. The URI uniquely identifies the resource and the body contains the state (or state change) of that resource. Then, after the server completes processing, the appropriate state, or the piece(s) of state that matter, are communicated back to the client via headers, status and response body. A container provides the concept of "session" that maintains state across multiple HTTP requests. In REST, the client must include all information for the server to fulfill the request, resending state as necessary if that state must span multiple requests. Statelessness enables greater scalability since the server does not have to maintain, update, or communicate that session state. Additionally, load balancers do not have to deal with session affinity for stateless systems. State, or application state, is that which the server cares about to fulfill a request—data necessary for the current session or request. A resource, or resource state, is the data that defines the resource representation—the data stored in the database, for instance. Application state may be data that could vary by client, and per request. Resource state, on the other hand, is constant across every client who requests it. (3) Cacheable. Clients may cache responses. Responses must therefore, implicitly or explicitly, define themselves as cacheable, or not, to prevent clients reusing stale or inappropriate data in response to further requests. Well-managed caching partially or completely eliminates some client-server interactions, further improving scalability and performance. (4) Client-Server. The uniform interface separates clients from servers. This separation of concerns means that, for example, clients are not concerned with data storage, which remains internal to each server, so that the portability of client code is improved. Servers are not concerned with the user interface or user state, so that servers can be simpler and more scalable. Servers and clients may also be replaced and developed independently, as long as the interface is not altered. (5) Layered System. A client cannot ordinarily tell whether it is connected directly to the end server, or to an intermediary along the way. Intermediary servers may improve system scalability by enabling load-balancing and by providing shared caches. Layers may also enforce security policies. (6) Code on Demand (optional). Servers are able to temporarily extend or customize the functionality of a client by transferring logic to the client that it can then execute. Examples of this may include compiled components such as Java applets and client-side scripts such as JavaScript. Complying with these constraints, and thus conforming to the REST architectural style, will enable any kind of distributed hypermedia system to have desirable emergent properties such as performance, scalability, simplicity, modifiability, visibility, portability and reliability. The only optional constraint of REST architecture is code on demand. If a service violates any other constraint, it cannot strictly be referred to as RESTful.

In computer programming, an application programming interface (API) specifies how software components should interact with each other. In addition to accessing databases or computer hardware such as hard disk drives or video cards, an API may be used to simplify the programming of graphical user interface components. An API may be provided in the form of a library that includes specifications for routines, data structures, object classes, and variables. In other cases, notably for SOAP and REST services, an API may be provided as a specification of remote calls exposed to the API consumers. An API specification may take many forms, including an international standard such as POSIX, vendor documentation such as the Microsoft Windows API, or the libraries of a programming language, e.g., Standard Template Library in C++ or Java API. Web APIs may also be a component of the web fabric. An API may differ from an application binary interface (ABI) in that an API may be source code based while an ABI may be a binary interface. For instance POSIX may be an API, while the Linux standard base may be an ABI.

Overview

Some embodiments of the present disclosure address the problem of deploying and managing Internet-connected devices. Some embodiments are directed to approaches for network edge protocols. More particularly, disclosed herein and in the accompanying figures are exemplary environments, methods, and systems for deploying and maintaining Internet-connected networked devices and the multiplexing and demultiplexing of connections.

Conventions and Use of Terms

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. The articles "a" and "an" as used in this application and the appended claims should generally be construed to mean "one or more" unless specified otherwise or is clear from the context to be directed to a singular form.

If any definitions (e.g., figure reference signs, specialized terms, examples, data, information, definitions, conventions, glossary, etc.) from any related material (e.g., parent application, other related application, material incorporated by reference, material cited, extrinsic reference, etc.) conflict with this application (e.g., abstract, description, summary, claims, etc.) for any purpose (e.g., prosecution, claim support, claim interpretation, claim construction, etc.), then the definitions in this application shall apply.

This section and other sections may include terms and definitions that may be applicable to all embodiments described in this specification and/or described in specifications incorporated by reference. Terms that may be special to the field of the various embodiments of the disclosure or specific to this description may, in some circumstances, be defined in this description. Further, the first use of such terms (which may include the definition of that term) may be highlighted in italics just for the convenience of the reader. Similarly, some terms may be capitalized, again just for the convenience of the reader. It should be noted that such use of italics and/or capitalization and/or use of other conventions, styles, formats, etc. by itself, should not be construed as somehow limiting such terms beyond any given definition and/or to any specific embodiments disclosed herein, etc.

USE OF EQUIVALENTS

As used herein, the singular forms (e.g., a, an, the, etc.) are intended to include the plural forms as well, unless the context clearly indicates otherwise.

In the following description and claims, the terms coupled and connected, along with their derivatives, may be used. It should be understood that these terms are not necessarily intended as synonyms for each other. For example, connected may be used to indicate that two or more elements (e.g., circuits, components, logical blocks, hardware, software, firmware, processes, computer programs, etc.) are in direct physical, logical, and/or electrical contact with each other. Further, coupled may be used to indicate that that two or more elements are in direct or indirect physical, electrical and/or logical contact. For example, coupled may be used to indicate that two or more elements are not in direct contact with each other, but the two or more elements still cooperate or interact with each other.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The terms that are explained, described, defined, etc. here and other related terms in the fields of systems design may have different meanings depending, for example, on their use, context, etc. For example, task may carry a generic or general meaning encompassing, for example, the notion of work to be done, etc. or may have a very specific meaning particular to a computer language construct (e.g., in STDL or similar). For example, the term transaction may be used in a very general sense or as a very specific term in a computer program or computer language, etc. Where confusion may arise over these and other related terms, further clarification may be given at their point of use herein.

Reference is now made in detail to certain embodiments. The disclosed embodiments are not intended to be limiting of the claims.

DESCRIPTIONS OF EXEMPLARY EMBODIMENTS

FIG. 1A shows a system that enables connections between devices using a multiplexer and demultiplexer.

FIG. 1A shows. a system 100 comprising a first device 101 connected via a connection 104 to a second device 102. Device 101 includes software 103 Muxer. Device 102 includes software 104 Demuxer.

Multiplexing may be defined as a system or signal involving simultaneous transmission of several messages along a single channel of communication.

For example, in telecommunications and computer networks, multiplexing (sometimes contracted to muxing) is a method by which multiple analog or digital signals are combined into one signal over a shared medium. The aim of multiplexing may be to share a scarce and/or costly etc. resource. For example, in telecommunications, several telephone calls may be carried using one wire.

A multiplexed signal may be transmitted over a communication channel, such as a cable, radio, etc. Multiplexing may divide the capacity of a communication channel into several logical channels, using one channel for each message signal or data stream to be transferred. A reverse process, known as demultiplexing, extracts the original channels on the receiver end.

A device that performs the multiplexing is called a multiplexer (MUX), and a device that performs the reverse process is called a demultiplexer (DEMUX).

Demultiplexing reverses the effect of multiplexing, and may break a single data stream into several streams, transfer them simultaneously over several communication channels, and recreating the original data stream.

In one embodiment, a multiplexer (also called, referred to, known as, designated here or elsewhere as MUX, Muxer, muxer, muxer project, muxer system, MUX function, concentrator, combiner, and/or equivalent or similar terms, synonyms, etc.) acts to join, combine, splice, attach, time-slice, or otherwise perform one of more functions to combine etc. one or more protocols, packets, frames, fields, etc.

In one embodiment, a demultiplexer (also called, referred to, known as, designated here or elsewhere as DEMUX, DMX, DeMuxer, demuxer, demuxer project, demuxer system, DEMUX function, splitter, extractor, and/or equivalent or similar terms, synonyms, etc.) acts to split, separate, extract, detach, time-separate, or otherwise perform one of more functions to split etc. one or more protocols, packets, frames, fields, etc.

In one embodiment, a multiport software component consists of two pieces (components etc.) of software, a Muxer that accepts socket connections over a number of bound ports to be "multiplexed" over one TCP port, and a Demuxer that accepts connections over one TCP port and "demultiplexes" the socket connections to target any number of target ports to a single target endpoint.

In one embodiment, the multiport software allows multiple TCP and UDP ports to be transported over one TCP port making the Multiport project ideal for mapping over a remote connection.

In various embodiments, the multiport software may use any form of transport for the connections. For example, the transport may be an internet connection using TCP/IP. In other embodiments, other protocols, other communication standards, combinations of protocols, combinations of communications standards etc. may be used.

In various embodiments, the multiport software may use any form of multiplexing for the connections. For example, the multiplexing may be performed by time-division multiplexing. In other embodiments, other multiplexing methods, other multiplexing standards, multiplexing algorithms, etc. may be used.

For example, multiplexing technique may be a multiple access method or channel access method, for example, time-division multiple access (TDMA) and statistical multiplexing into carrier-sense multiple access (CSMA).

In various embodiments, multiplexing may be provided by the Physical Layer of the OSI model. In various embodiments, multiplexing and/or multiple access may also involve a media access control protocol, which is part of the Data Link Layer. In various embodiments, various combinations of one or more such OSI layers may be used.

For example, in one embodiment, the Transport layer of the OSI model, as well as TCP/IP model, may allow statistical multiplexing of several application layer data flows.

In one embodiment, Code-division Multiplexing (CDM) may be used. CDM is a technique in which each channel transmits its bits as a coded channel-specific sequence of pulses. This coded transmission typically is accomplished by transmitting a unique time-dependent series of short pulses, which are placed within chip times within the larger bit time. All channels, each with a different code, can be transmitted on the same channel (e.g. fiber etc.) and asynchronously demultiplexed.

In one embodiment, other multiple access techniques may be used. For example, in one embodiment, time-division multiple access (TDMA) may be used. For example, in one embodiment, frequency-division multiple access (FDMA) may be used. For example, in one embodiment, code-division multiplex techniques may be used as an access technology. For example, code-division multiple access (CDMA) may be used, as employed in the Universal Mobile Telecommunications System (UMTS) standard for the third-generation (3G) mobile communication identified by the ITU. Similarly and multiplexing technology employed by any ITU or similar standard (e.g. 3G, 4G, 5G etc.) may be used. In other embodiments, any such or similar multiple access, multiplex or similar standard, proprietary, or non-standard technology may be used.

Further, in various embodiments, combinations of multiplexing technology may be used. For example, a connection may use a muxer to combine several data streams into a single data stream that may then in turn be multiplexed (possibly using a different multiplexing system) with other data streams. Such combinations of multiplexing technology may be nested, layered, combined etc. to any depth, in any manner etc.

In the various exemplary embodiments that follow, a simple internet connection using, for example, TCP/IP with TCP ports may be used as an example of the connection or communication channel etc. used to connect devices. It should be carefully noted, however, that any form of channel, connection, link etc. may be used. It should be noted that such a channel may itself comprise any number of multiple channels, connections, links etc. (e.g. internet plus other links, radio plus cable, wired plus wireless, etc.). Such multiple channels may operate in series, in parallel, in combinations of serial and parallel, etc.

In FIG. 1A, system 100 accepts sockets on the Muxer side, transports the sockets and data over a single TCP port to Demuxer. Demuxer then targets a host with those socket connections and data.

In one embodiment, the configuration of Muxer on the PC side defines which ports should be handled, in this case TCP ports 22, 80 and UDP port 161. With this configuration Muxer will be looking for traffic on these ports and tunnel the traffic to Demuxer target on TCP port 5999 at IP endpoint 10.10.10.10. Demuxer will take these TCP socket connections to TCP port 5999 and decode the proper port and target port on the target device (in this case itself). Any reply from the target port will be transferred back through Demuxer to Muxer and back to the originating client/manager/web browser.

In one embodiment, the software components comprising the Demuxer and Muxer may be referred to as a Multiport (also called multiport, DE/MUXER), multiport project, or other similar terms, synonyms, etc. In some cases individual Demuxer and Muxer components form the Multiport project. In some cases various combinations of Demuxer and Muxer with other software elements, modules, daemons, binaries, OS components, etc. may be referred to as Multiport.

In one embodiment, the pieces of the Multiport project can be driven by the command line, a configuration file or a combination of both. In one embodiment, the Muxer and Demuxer can also be run as a background service on a Unix systems.

In one embodiment, the Demuxer has two important configurations, one is the bind IP:port and the other is the target host. The bind IP:port is the endpoint that Demuxer listens to for incoming TCP socket connections that contain the socket connection requests to send to the target host. The target host is a IP address or hostname that will be targeted by the Demuxer software.

In one embodiment, by default, if no bind IP:port is specified, it will default to 127.0.0.1:5999. In one embodiment, if no target host is specified demuxer may target 127.0.0.1. These example settings may be used when Demuxer is connected to by a connection that wishes to access the device that is running the Demuxer software.

In one embodiment, a set of command line options etc. for Demuxer (with software module named demux) may be as follows (of course any number, type, format, form, etc. of options, features, switches, functions etc. may be used):

demux [-h] [-v(erbose)][-f config_file][-d][-p pidfile][-u user_2_run_as][-b bindip:port][-e<udp_expire_time>][-t<target_host>]

-h produces help output
-v produces verbose output, adding a second-v produces debug output also
-f use configuration file before parsing command line options
-d run as daemon (non windows only)
-p generate specified pidfile if daemon (non windows only)
-u user to run as (non windows only, must start as root, drop privs to this user)
-b bind/listen on ip:port (default 127.0.0.1:5999)
-e udp expire time in seconds (default 120)
-t target_host (default 127.0.0.1)

In one embodiment, the Demuxer may accept the specification of a configuration file (-f). In one embodiment, the configuration file may configure all or some of the commands on the command line and also the port filter that can restrict access to having the connecting Muxer connect to certain ports. The configuration file format will be covered below.

In one embodiment, the UDP expire time option lets a user configure the UDP socket timeout to a value other than its default 120 seconds. This UDP expire time option allows the user to configure UDP sockets that stay alive longer or shorter that have no traffic flowing on them.

In one embodiment, the (-d) run as daemon, (-p) create a pidfile and (-u) run as user are used when running the demuxer software as a daemon. The (-p) and (-u) option are only valid if the (-d) option is specified. By default if the Demuxer software is run as root it will drop privileges after startup to user 'nobody' or the user specified by the (-u) parameter. The (-u) parameter is only relevant of the Demuxer software was started as root.

In one embodiment, the (-v) option can be used multiple times to increase the verbosity of the Demuxer software console output and can be useful for debugging or configuration tuning.

In one embodiment, the Demuxer configuration file is optional but can allow a user to configure the demuxer to not only setup the parameters available on the command line, but create TCP and UDP port restrictions of which resources that the connecting Muxer software is allowed to access.

The following is an example configuration file for the Demuxer software (of course, any format, features, options, key-value pairs, other similar configuration mechanisms, etc. may be used):

verbose 0,1,2 2=maximux verbosity
verbose 2
bind/listen to endpoint for muxer connections on: (default to 127.0.0.1:5999)
bind_port 65535
bind_ip 0.0.0.0

Target Host (default 127.0.0.1) can be IP or hostname

target_host 127.0.0.1

UDP port expire time in seconds (default 120) UDP mappings expire if no packets flow in this many seconds

udp_expire_time 240

Filter TCP, executed in order

filter_tcp 22 allow
filter_tcp 80 allow
filter_tcp 0-1024 deny
filter_tcp 2224 deny

Filter UPD

filter_udp 5959 allow
filter_udp 5958 allow
filter_udp 5957 allow
filter_udp 5959 allow
filter_udp 0-65535 deny In one embodiment, the filter_tcp and filter_udp options are read and then processed in order and can be a port or a port range that is either allowed or denied.

In one embodiment, by default all ports are allowed unless specifically set to deny in the configuration file.

In one embodiment, for example in the port-forwarding case, there may be times when you want to access multiple machines on multiple ports in the same method; this would not be possible with port-forwarding since you can only port-forward one port to one machine. If you wanted to access an IP camera on port 80 and 443 you could only port-forward 80 and 443 to one camera, if you needed to setup another camera you would have to use ports other than 80 and 443, this may or may not work depending on the camera UI.

In one embodiment, the Muxer project would allow you to connect to devices with the same method using an arbitrary port for each device wished to share, and access them in the same method on the client side.

In one embodiment, each target device you wish to share on the internal network may have a Demuxer pointed at it.

In one embodiment, one target service can allow access to any port on the target device and the desired ports need not be determined ahead of time.

In one embodiment, in a typical installation the user configures each "service" it wishes to access on a device and each "service" is connected to individually. If a user wants to add a target port/service, the user may setup another "service" on the target remote device.

In one embodiment, to setup a connection to use Muxer a target service may be pointed at the Demuxer software. In this case, the Demuxer software may be started up as a service at boot time and running on a known port (default 5999) and targeting the desired host if not localhost.

FIG. 2A shows a device including a software daemon and demultiplexer.

In FIG. 2A, system 200 shows a single device including two software components. The first software component comprises a demultiplexer 202. The second software component comprises a daemon 201.

In multitasking computer operating systems, a daemon may be a computer program that runs as a background process, rather than, for example, being under the direct control of an interactive user. Traditionally, the process names of a daemon end with the letter d, for clarification that the process is in fact a daemon (such as connectd for example), and to differentiate a daemon and a normal computer program. For example, syslogd is the daemon that implements the system logging facility, and sshd is a daemon that serves incoming SSH connections. In other embodiments, the second software component, shown as daemon 201 in FIG. 2A, may operate in a manner other than a daemon. For example, a user may run one or more of the software components shown in any of the embodiments herein in interactive mode.

In one embodiment, the daemon 201 may allow remote connections as described, for example, in US patent application U.S. Ser. No. 15/613,281, which is incorporated by reference, and/or any applications that are incorporated by reference. For example, remote connections between devices may be enabled by use of one or more servers. In one embodiment, a server or combinations of servers, for example, may allow connections to be made between devices that are on network that operate with NAT (or CG-NAT or any other similar network mapping, and/or other network system that alters, changes, hides, maps, permutes, etc. an IP address, port or equivalent etc. and/or maps public IP addresses to private IP addresses etc. or otherwise prevents normal access to a public IP address and port combination etc.). In one embodiment, a server, for example, may operate as a proxy. In one embodiment, a server or combinations of servers, for example, may allow connections to be made between devices in a peer-peer (P2P), direct connection, peer networked, combinations of these network connection means, methods and/or other similar networking fashion, manner etc.

In one embodiment, a server or combinations of servers, for example, may allow connections to be made between devices in a peer-peer (P2P), direct connection, peer networked, combinations of these network connection means, methods and/or other similar networking fashion, manner etc. and connections that are made may be protected, secured etc. by one or more mechanisms, methods, means, algorithms, combinations of these or similar and the like etc. Such mechanisms etc. may prevent, detect, and/or mitigate, provide barriers to, etc. cyberattacks, system abuse, device theft, etc. In such an embodiment, such a server or combinations of servers, for example, may be a connection management system. Examples of connection management systems are described in one or more specifications incorporated by reference and any such system may be used with any of the components described herein. For example, in one embodiment a user, manufacturer, retailer etc. may manually e.g. by interactive program (or by automated means, methods, algorithms, scripts, routines, schedules, code, automated program, procedure, etc.) register, configure, onboard, provision, combinations of these, etc. and/or otherwise prepare a device for connections, management, control, etc. Such registration etc. may be completed, programmed etc. using a first IP address. When the registered device (the object of registration, etc.) is deployed, installed, etc. and first connected, a second IP address of the device may be latched, or otherwise stored, recorded, filed, kept as state information etc. Further connections to the device may then be checked against such a latched IP address. In one embodiment, for example, connections may be refused (by the connection management system etc.) if the device has an IP address that is different from the latched IP address. In such embodiments, for example, controls may be present that permit the IP address latch to be reset or permit control over the checks, permissions, actions performed on checking, combinations of these and/or any other aspect of the IP address latching and IP address checking mechanism(s), including, but not limited to, for example, number and type of latched IP address, matching criteria for latched IP addresses, etc. In such embodiments, for example, controls may be present that permit one or more IP addresses to be checked, filtered, matched, latch(es) set or reset, etc. at any time (i.e. at manufacture, deployment, first use, re-sale, returned goods, re-deployment, moved location of device(s), update of firmware or software, OS update, device(s) warehoused, device(s) stored, refurbished, OEM sales, or any other point in time during the lifetime of a device etc.).

In one embodiment the daemon e.g. system component daemon 201 etc. in FIG. 2A etc. (which may be called connectd etc.) or other system component etc. may use a restricted IP address connection filter, control, matching algorithm, or other program etc. Such a filter etc. may be used, for example, as a security feature, function, control, etc. to restrict connections to certain IP addresses. The restricted IP addresses may be set as a single IP address, a range of IP addresses, a list of addresses, a pool of addresses, groups of addresses, etc. In one embodiment, wild-card matching, regex expressions, etc. may be used to set one or more restricted IP addresses. Of course, either deny or allow permissions (or a combination of both) may be used to set filters etc. In one embodiment, for example, the restricted IP set may be set to 255.255.255.255 and may enable latching, storing, etc. of the first connected TCP socket. If the IP address is restricted then a return of "Security Violation" as a HTTP server response in may sent e.g. in JSON. When restricted IP is set to 255.255.255.255, the next TCP connection will latch the restricted IP address filter with the filter of the connecting socket.

For example, in one embodiment, a daemon e.g. connectd etc. may return a valid HTTP 1.0 response with a JSON body. This embodiment may, for example, allow browser based sandbox code, that only allows HTTP requests (no layer 4 sockets allowed), to determine if restricted IP filtering is active between a client and a proxy, e.g. a remote.it proxy etc.

Such an example embodiment of IP address restriction, filtering etc. may, for example, be implemented, described, etc. using the following example skeleton algorithm:

Step 1: connectd started
Step 2: accept next TCP socket
Step 3: restricted IP=0?
Step 4: Yes, allow socket connection to continue to IP target
Step 5: No, restricted IP=255.255.255.255?
Step 6: Yes, set restricted IP to TCP source socket IP, go to step 4
Step 7: No, check TCP source socket IP
Step 8: Match restricted IP?
Step 9: Yes, go to step 4
Step 10: No, return security violation HTTP JSON blob with TCP socket IP
Step 11: Close socket
Step 12: go to step 2

Of course any equivalent code, algorithm, flow, process, procedure and/or code, algorithm, flow, process, procedure based on the above, may be used for such IP address restriction, filtering etc. with one or more variations in functions, features, etc. In one embodiment, the IP address latching function (i.e. involving step 6 in the above algorithm etc.) may be controlled, enabled, disabled, etc. by a user, device owner, system manager, or by any means, either manual (i.e. by browser control) or automated (e.g. through continuous monitoring and/or control by intelligent software etc.). In one embodiment, any step in the above algorithm etc. or step in any code, algorithm, flow, process, procedure based on the above may be controlled, enabled, disabled, etc. by a user, device owner, system manager, or by any means, either manual (i.e. by browser control) or automated (e.g. through continuous monitoring and/or control by intelligent software etc.).

In one embodiment any type of IP restriction, IP filtering, IP checking etc. may be used. In one embodiment the TCP source socket IP address may be used for filtering, checking, matching, etc. In other embodiments, any IP address, combinations of IP addresses, combinations of one or more IP addresses with any other data, information, socket parameters, metrics, data, information, configuration parameters, etc. may be used as the basis for filtering, restriction, checking, and/or other control. administrative, security etc. functions and the like. In one embodiment, any address parameters, any connection data, source data, target data, device parameters, device settings, configuration data, configuration settings, source connection parameters, target connection parameters, other system parameters, settings, configuration(s), etc. and the like may be used as the basis for filtering, matching, control, management, restriction of connections, security, administration functions etc. and the like. For example, in one embodiment connections may be filtered, restricted, etc. based on geolocation (i.e. physical location obtained by any means, methods, algorithms, programs, etc. to any level of resolution, uncertainty etc.). For example, in one embodiment connections may be filtered, restricted, etc. based on device name (or any property, characteristic, configuration, etc. of any device). For example, in one embodiment connections may be filtered, restricted, controlled, etc. based on account name (or any property of the account, user, owner, etc.). For example, in one embodiment connections may be filtered, restricted, etc. based on any name, text, ID, UID, GUID, or other parameter, characteristic, property, etc. of the device, device components (e.g. SIM, SD-card, etc.), one or more users, owners etc. For example, in one embodiment connections may be filtered, restricted, allowed, denied, otherwise controlled, throttled, restricted, managed, etc. based on any one or more factors, information, data, property, characteristic, etc. including, but not limited to: device and system settings, stored data, configuration, programming, AI control, machine learning algorithm, information obtained from a device, user information, time, device location, user location, connection type (e.g. wireless, cellular, etc.), account type (e.g. paid, commercial, free, etc.), access control list(s), security clearance, pattern of device use, use pattern(s) associated with user(s), log information, whitelists, blacklists, country of device or user(s), device owner, device use characteristics, device use metrics, bandwidth use, login attempts, timing of login attempt(s), failed connection attempts, repeated connection attempts, connection patterns, previous security violations, patterns of abuse, or any combination of these and/or any other factors, measures, metrics, information, learning, algorithms, system inputs, inputs external to the system (information gleaned from Internet, other sources, etc.), log data, data analysis, internet conditions, traffic analysis, system resources, and the like etc.

In one embodiment, such control, filters, restrictions, etc. as described above, based, as an example, on IP address etc. may be used in combination with other security features, functions, controls, configuration, etc. (either based on IP address or other means, methods, algorithms, etc.) as described elsewhere herein and/or as described in one or more specifications and applications incorporated by reference.

In the embodiment described above based, as an example, on IP address etc. and using control, filters, restrictions, etc. is intended as an example only and, in other embodiments, use of any information to filter, restrict, otherwise control connections etc. including but not limited to IP address(es) may be used in combination with other security features, functions, controls, configuration, etc. (either based on IP address or other means, methods, algorithms, etc.) as described elsewhere herein and/or as described in one or more specifications and applications incorporated by reference.

Several possible combinations, uses, etc. of the Multiport project and technology, systems, functions, and other embodiments are possible as described in US patent application U.S. Ser. No. 15/613,281, which is incorporated by reference, and/or as described in any applications and specifications that are incorporated by reference. Several example combinations of the Multiport project and technology will be described herein, but such possible combinations, uses, examples, etc. are merely examples and any and all possible combinations are not limited to those discussed below, elsewhere herein and in any specifications incorporated by reference.

For example, in one embodiment, the daemon 201 may be an agent, software module, software component, binary executable, code module, plugin, library, run-time module, interpreted code, library, code library, open-source project, combinations of these and the like etc. that may include a service application (e.g., YOICS daemon, Linux daemon, yoics software, combinations of these and/or other applications, drivers, daemons and the like, etc.). In various commercial embodiments, the daemon may be called YOICS daemon, yoicsd, weavedconnectd, connectd, remoteit, remoteitd, or the binary, software code etc. may have other names etc.

For example, in one embodiment the Multiport project may be used in combination with automatically identifying a device connected to a network.

For example, in one embodiment the Multiport project may be used in combination with automatically configuring the device.

For example, in one embodiment the Multiport project may be used in combination with a configured device that is associated with a user.

For example, in one embodiment the Multiport project may be used in combination with a system where the user is permitted to grant varying degrees of permission to configure the device to at least one other user.

For example, in one embodiment the Multiport project may be used in combination with a system further comprising linking the device to an account.

For example, in one embodiment, the Multiport project (or any part of the Multiport project or parts of the Multiport project) may be used in combination with a system using any combination using any number of the above embodiments (or one or more parts of the above embodiments).

Further, in one embodiment, the Multiport project (or any part of the Multiport project or parts of the Multiport project) may be used in combination with any of the various embodiments, or parts, pieces, components, structure, function etc. of any embodiments described in US patent application U.S. Ser. No. 15/613,281.

In one embodiment, a generic TCP service may be used to target Demuxer. For example, assuming Demuxer is running on TCP port 5999, the setup, system etc. shown in FIG. 2A may be used.

FIG. 3A shows a system 300 that comprises a first device and second device; the first device comprising a multiplexing software component that is the initiator/host side of a connection; the second device comprising a de-multiplexing software component that is the target side of the connection.

In one embodiment, the multiport project may contain two sub-projects that interoperate with each other: Muxer and Demuxer. In one embodiment, the Muxer can listen to a number of UDP and/or TCP sockets and tunnel them over TCP connections that target one TCP port on the Demuxer. In one embodiment, the Demuxer will take these connections and create equivalent TCP and UDP connections to its specified target. In different embodiments, different protocols, etc. may be used.

In one embodiment, the Muxer may be an initiator/host side of the connection. Muxer accepts socket connections and sends them to the target Demuxer.

In one embodiment, the Demuxer may be a target side of the connection. Demuxer accepts connections from Muxer and targets the appropriate TCP or UDP port on the Demuxer target.

In one embodiment, the Demuxer is the target software that accepts connections from Muxer on a single TCP port and creates the requested TCP and UDP sockets to the specified target.

In FIG. 3A, the software daemon software component, called remote.it may perform a similar function to the software daemon component connectd in, for example, FIG. 2A.

FIG. 4A shows a device 400 including a software daemon and demultiplexer with multiple output ports configured.

In FIG. 4A, the demuxer provides one or more ports that may be defined by configuration. In one embodiment, the port numbers and one or more additional characteristics may be defined by a configuration. In one embodiment the configuration of ports, other features, functions, capabilities, operations, etc. may be enabled by a configuration file. In one embodiment the configuration of ports, other features, functions, capabilities, operations, etc. may be enabled by one or more command line parameters, switches, options, other functions and the like. In one embodiment the configuration of ports, other features, functions, capabilities, operations, etc. may be enabled by command line, by configuration file, or by any combination of options, switches, and/or similar configuration functions. In one embodiment, the configuration of demuxer, muxer, one or more daemons (e.g. connectd, remote.it daemons, software modules, components, plug-ins, etc.) may be performed by any means including files, options, switches, etc. The location (e.g. location of configuration files etc. on target, host, initiator, etc.), manner (e.g. use of files, command line options, etc.), time (e.g. at boot time, during operation, etc.) of configuration etc. may vary depending on use, application, etc.

In one embodiment, software components described here (e.g. connectd daemon, YOICS daemon, remote.it daemon, Muxer, Demuxer, etc.) or any software component used in a system described herein, may be built using a Build environment. Build operations etc. may be done with the make file in the src directory for unix, or either Windows Dev Studio 2010 or 2017 (or equivalent software tools, suites, programs, systems, etc.). The multiport project, or parts thereof, can also build with the buildall script in the root directory that builds all architectures in available in the tools directory.

In one embodiment, the Demuxer command format (for the Demuxer software component called demux) may be as follows (of course any command line format, options, switches, features, etc. may be used):

demux [-h] [-v(erbose)][-f config_file][-d][-p pidfile][-u user_2_run_as][-b bindip:port][-e<udp_expire_time>][-t<target_host>]

-h produces help output
-v produces verbose output, adding a second-v produces debug output also
-f use configuration file before parsing command line options
-d run as daemon (non Windows only)
-p generate specified pidfile if daemon (non Windows only)
-u user to run as (non Windows only, must start as root, drop privs to this user)
-b bind/listen on ip:port (default 127.0.0.1:5999)
-e udp_expire_time in seconds (default 120)
-t target_host (default 127.0.0.1)

In one embodiment, the Demuxer will listen on an IP:Port for connections from the Muxer (with default IP:Port of 127.0.0.1:5999). Typically this will be through a remote.it connection (i.e. a connection that may be established by use of the remote.it software daemon). A remote.it service (such as ssh, vnc, etc.) will target the Demuxer listen IP:Port.

In one embodiment, the Demuxer target host may be the host that all connections will target. In one embodiment, the target host by default may be a localhost address, such as 127.0.0.1 for example. In one embodiment, the target host may be overridden with the -t option. In one embodiment, either an IP address or a resolvable hostname can be used for the target host.

In one embodiment, the Muxer may map ports from its side that may be in listen mode to ports on the target host that may also be in listen mode for TCP and bound for UDP.

In one embodiment, the Muxer may be the initiator/host side of the connection. In one embodiment, the Muxer may accept socket connections and send them to the target Demuxer.

FIG. 5A shows a device 500 including a software daemon and multiplexer.

In FIG. 5A, TCP ports 22 and 80, along with UDP port 161 may be forwarded to a demuxer target via a connection established by daemon 503 (e.g. connectd or other daemon software component, module, plug-in, library, etc. such as YOCIS, remote.it etc.).

In one embodiment, the Muxer (using a software component called muxer) command format may be as follows (though any command format, form, functions, options etc. may be used):

muxer [-h] [-v(erbose)] [-d] [optinal pid file] [-f config-_file][-u user_2_run_as] [-t] <bind/listen port list>
-h produces help output
-v produces verbose output, adding a second-v produces debug output also
-d runs the program as a daemon (unix only)
-p creates the specified pid file if run as daemon (unix only)
-u drop privileges to this user when daemonized (unix only, defaults to nobody)
-f use configuration file before parsing command line options
-t demuxer target ip and port (defaults to 127.0.0.1:5999 if not specified)

Following the command options is the bind/listen list of sockets to accept traffic from and their target ports. Each entry may be in the following format (although any format, form, etc. may be used):

[protocol U or T] [listen port] [:optional target port]
Example TCP port 80 targeting port 8080 demuxer side: T80:8080
Example TCP port 80 targeting port 80 demuxer side T80

Example UDP port 5000 targeting port 5000 demuxer side:
U5000
Example UDP port 5000 targeting port 3333 demuxer side
T5000:3333
Example sending TCP port 80 and 443 and local UDP port 3845 to 3800 demuxer side:
T80 T443 U3845:3800
Example of full command line use:
muxer-v T80 T443 U3845:3800
Example with non-default Muxer target:
muxer-v-t 127.0.0.0:5998 T80 T443 U3845:3800

In one embodiment, the Muxer configuration file may be parsed before any command line arguments. In one embodiment, any command line arguments may override configuration file options In one embodiment, a sample Muxer configuration file may be as follows (of course, any format, form, options, structure, number of files, type of files, etc. may be used):
any line starting with '#' is a comment and will be ignored.

target demuxer address
target_host 127.0.0.2
target_port 5998
verbose level 0,1,2
verbose 2
if daemon, user to run as
run_as_user nobody
run_as_user mike
sockets to bind
socket_list T2223:22 T8080:80 T2229
IP to bind to
bind_ip 127.0.0.1

The use of the components in the Multiport project provide a powerful tool to establish and use connections between devices. Further the connections between devices and/or between devices and one or more severs, central services, central operations, central control etc. may perform control operations etc.

For example, in one embodiment, one or more of the multiplexed connections may be a control service, application, function, combinations of these and/or the like etc. Such a control service etc. may, for example, allow administration functions to be performed (possibly remotely) on one or more devices, for example. In one embodiment, the control service may allow one or more scripts to be run remotely on one or more devices. For example, in one embodiment a control service called "server channel", as described in one or more specifications incorporated by reference, may be used to convey files, data, information, etc. between server and devices, device to device, etc. For example, "server channel" or other similar mechanism, channel, protocol, service etc. may be capable of using a standard or proprietary protocol to convey files, data, information, errors, logs, messages, commands, scripts, programs, routines, macros, source code, object code, binary code, combinations of these and other similar data etc. (typically in an encrypted and authenticated fashion) such as control scripts, functions, updates, firmware updates, other updates, instructions for these and/or other operations, commands, configuration, control etc.

In one embodiment, the muxer and demuxer software components may allow either local or remote control of their functions. For example, the muxer software may allow the configuration of the demuxer software. For example, the demuxer software may allow the configuration of the muxer software. The muxer and demuxer software to be configured may reside on the same device or on different devices. For example, the muxer may configure the demuxer software (or vice versa, with the demuxer configuring the muxer) to listen on a certain port, open a connection, allow a connection, permit a connection, make a connection, deny a connection, test a connection, drop a connection, close a connection, modify a connection, manage a connection, and/or perform any other similar function, operation, command, script, algorithm, and the like etc. Further such commands, operations, configurations etc. may not be limited to operations etc. on connections; any type of system function, command, operation, action, control, configuration, combinations of these and the like etc. my be performed etc. to perform any type of management etc.

In one embodiment, the configuration of muxer and/or demuxer and/or any of the other components shown in any system here may be performed at any time in any manner. For example, a user may control such configuration manually, under script control or in any similar fashion etc. For example, a user may control such configuration remotely. For example, a user may control such configuration in a batch, bulk fashion, multiple operations at a time, etc. in order to configure multiple devices and device software components. For example, a user may control such configuration during device operation. For example, a user may control such configuration at boot time (or at any time, mode of operation etc.) of one or more devices. For example, a user may control such configuration remotely from one or more devices.

In one embodiment, the muxer and demuxer software components may be combined, embedded, merged, operate, cooperate, act with, depend on, etc. with any other software component in one or more of the systems described herein. For example, the muxer and/or demuxer software components may be combined etc. with the connectd daemon or equivalent and/or with any function, program, application, software module, code module, plug-in, combinations of these and the like etc.

In one embodiment, the muxer or demuxer software components may be located on a device separately from the device providing a service and/or a device or devices providing remote connection. Thus, for example, device A may include a first software component that provides a service e.g. ssh; device B may include a second software component that allows remote connections e.g. connectd daemon; device B may also include the muxer software component; device C may include both the demuxer and connectd software components. In this case device A may be connected directly to device B; device B may be remotely connected to device C (using the connectd software components to provide the remote connection).

In one embodiment, multiple connections between devices may be made. In one embodiment, multiple connections between devices may be made in different directions. For example, device A may be remotely connected to device B. Suppose a first service SE1 (e.g. ssh, other application, program or the like etc. on port 22 or other port etc.) is located on a first device, device 1 or DE1 Then a second device DE2 may connect to the first device DE1 We can call this connection DE2-DE1 where the order may, for example, indicate that device 2 made the connection to device 1. We could call the service DE1:SE1 to indicate the service SE1 is running on DE1 We could call the service connection, when made, DE2-DE1:SE1, where again the order indicates that device 2 is connected or attached, connected etc. to device 1. In this notation a dash "-" (or other symbol(s) etc, since the exact notation is not important) represent an internet or other network, similar etc. connection. A second service may be configured using an established connection or any other configuration method (command line, configuration file, etc.). For example, device 1 may instruct device 2 to listen for a connection on a configured port. Thus, for example, a communication scheme may be established in which service 1 is setup such that device 2 made the connection to device 1 as connection DE2-DE1:SE1; and service 2 is setup such that device 1 instructs device 2 to listen such that connection may be made as DE1-DE2:SE2 (where the role of DE1 and DE2 is reversed). For example, in one embodiment, control messages, other similar operations etc. may be exchanged using a control channel multiplexed with other services. Of course any method, means, algorithm etc. may be used to exchange messages, perform control and/or otherwise configure one or more end points, remote devices, or any internet-connected device. Note that any number, type, etc. of devices; any number, type, etc. of services; any ordering, direction, listening mode or type, socket instructions, etc. of or for any connection, communication, networking, control purposes, etc. and the like may be used.

Note that the notation used above may be combined with the IP:PORT notation so that for example DE1:SE1 could be indicated (i.e. use notation, be diagrammed as etc.) as 127.0.0.1:4999 showing that device 1 has a service, service 1, with port number 4999, located at IP address 127.0.0.1 (a localhost address in this case) on port 4999. The IP:PORT notation also relates to a socket, as explained below.

In computer networking, a port is an endpoint of communication. Wired as well as wireless connections are terminated at the ports of hardware devices. At the software level, within an operating system for example, a port is a logical construct that identifies a specific process or a type of network service. Ports are identified for each protocol and address combination by 16-bit unsigned numbers, known as the port number. The most common protocols that use port numbers, are the Transmission Control Protocol (TCP) and the User Datagram Protocol (UDP).

A port number is associated with an IP address of a host and the protocol type of the communication. A port is part of the destination or origination network address of a message. Some designated port numbers may be reserved to identify specific services, so that an arriving packet can be easily forwarded to an application. The lowest numbered 1024 port numbers identify the most commonly used services, and are called the well-known port numbers. Higher-numbered ports are available for general use by applications and are known as ephemeral ports.

When used to identify a service, ports provide a port multiplexing function for multiple services or multiple communication sessions at one network address. For example, port multiplexing allows multiple devices to connect to a server device on port 22 using the ssh service (e.g. application, program, etc.). Note that this port multiplexing function is different from the muxer/demuxer function described herein and the difference is explained below.

In the client-server model multiple simultaneous communication sessions may be initiated for the same service. As an example of port use in the client-server model, consider a client PC with two browser windows open. One browser is pointed at the Google website, and the other at the Yahoo website.

The connection from PC to Google server may be diagrammed, described, noted, written in shorthand, using notation, etc. as:

PC—IP1:6200—Google IP2:80 (a standard or well-known port)

The combination of the PC IP address IP1 and PC port 6200 or IP1:6200 forms the socket on the client computer and Google IP address IP2 and well-known port 80 (for HTTP) or IP2:80 forms the destination socket on the Google server.

The connection from PC to Yahoo server may be diagrammed etc. as:

PC—IP1:6400—Yahoo IP3:80

The combination of the PC IP address IP1 and PC port 6400 or IP1:6400 forms the socket on the client computer and Yahoo IP address IP3 and well-known port 80 (for HTTP) or IP3:80 forms the destination socket on the Yahoo server.

Multiple connections may be made to Google IP2:80 (and also, of course, to Yahoo IP3:80). Thus, port 80 (on a server, for example) may accept multiple connections. Thus ports provide a port multiplexing function for multiple services or multiple communication sessions at a single network address. Note that this port multiplexing function is very different from the muxer/demuxer function described herein. The muxer/demuxer function described herein amongst many other features, functions, etc. is capable, for example, of multiplexing several applications, services etc. (each of which may use a separate port etc.) that would normally use multiple network connections on to a single network connection.

A port number is a 16-bit unsigned integer, with a range from 0 to 65535. TCP port number 0 is reserved and cannot be used, while for UDP, the source port is optional and a value of zero means no port. A process associates its input or output channels via an Internet socket, which is a type of file descriptor, with a transport protocol, an IP address, and a port number. This association is known as binding, and enables the process to send and receive data via a network. The operating system networking software transmits outgoing data from application ports onto the network, and forwards arriving network packets to processes by matching the packet IP address and port number. For TCP, only one process may bind to a specific IP address and port combination. Common application failures, called port conflicts, occur when multiple programs attempt to use the same port number on the same IP address with the same protocol.

Applications implementing common services often use designated or reserved well-known port numbers for receiving service requests from clients. This process is known as listening, and involves the receipt of a request on the well-known port and establishing a one-to-one server-client dialog, using the same local port number. Other clients may continue to connect to the listening port; this works because a TCP connection is identified by a tuple consisting of the local address, the local port, the remote address, and the remote port. The well-known ports are defined by convention overseen by the Internet Assigned Numbers Authority (IANA). The core network services, such as the World-Wide Web, typically use well-known port numbers. In many operating systems special privileges are required for applications to bind to these ports, because these are often deemed critical to the operation of IP networks. Conversely, the client end of a connection typically uses a high port number allocated for short term use, an ephemeral port.

The Internet Assigned Numbers Authority (IANA) is responsible for the global coordination of the DNS Root, IP addressing, and other Internet protocol resources. This includes the registration of commonly used port numbers for well-known Internet services.

The port numbers are divided into three ranges: the well-known ports, the registered ports, and the dynamic or private ports.

The well-known ports (also known as system ports) are those from 0 through 1023. The requirements for new assignments in this range are stricter than for other registrations, examples include:

22: Secure Shell (SSH or ssh) Secure Login
23: Telnet remote login service, unencrypted text messages
25: Simple Mail Transfer Protocol (SMTP) E-mail routing
53: Domain Name System (DNS) service
80: Hypertext Transfer Protocol (HTTP) used in the World Wide Web The registered ports range from 1024 through 49151. IANA maintains the official list of well-known and registered ranges. The dynamic or private ports range from 49152 through 65535. One common use for this range is for ephemeral ports.

Note that connections in the systems described herein may be established using any form of protocol. Thus, for example, a connection may be stablished using TCP/IP. Thus, for example, a connection may be stablished using UDP. Not all connections between devices have to be the same protocol. We will examine the details of connections next.

Connectionless communication is a data transmission method used in packet switched networks in which each data unit is individually addressed and routed based on information carried in each unit, rather than in the setup information of a prearranged, fixed data channel as in connection-oriented communication.

Under connectionless communication between two network end points, a message can be sent from one end point to another without prior arrangement. The device at one end of the communication transmits data addressed to the other, without first ensuring that the recipient is available and ready to receive the data. Some protocols allow for error correction by requested retransmission. The Internet Protocol (IP) and User Datagram Protocol (UDP) are connectionless protocols.

In telecommunications, a protocol data unit (PDU) is a single unit of information transmitted among peer entities of a computer network. A PDU may be composed of protocol specific control information and user data. In the layered architectures of communication protocol stacks, each layer may implement protocols tailored to or designed for a specific type or specific mode of data exchange. A packet transmitted in a connection-less communication is called a datagram. For example, the Transmission Control Protocol (TCP) implements a connection-oriented transfer mode, and the PDU of this protocol is called a segment, while the User Datagram Protocol (UDP) uses datagrams as protocol data unit for connection-less transfer. A layer lower in the Internet protocol suite, at the Internet layer, the PDU is called a packet, independent of the payload type.

Connectionless protocols are usually described as stateless protocols because the end point devices have no state or protocol-defined way to store, remember, keep etc. where the end point devices are in a conversation of message or datagram exchanges.

In connection-oriented communication the communicating peers first establish a logical or physical data channel or connection in a dialog preceding the exchange of user data. A connectionless communication has low overhead and also allows for multicast and broadcast operations in which the same data are transmitted to several recipients in a single transmission.

In connectionless communication the service provider usually cannot guarantee that there will be no loss, error insertion, failed delivery, duplication, or out-of-sequence delivery of the packet. However, the effect of errors may be reduced by implementing error correction within an application protocol.

In connectionless communication, optimization is difficult when sending several data units between the same two peers. By establishing a connection at the beginning of such a data exchange the components (routers, bridges) along the network path may be able to pre-compute (and hence cache) routing-related information, avoiding re-computation for every packet. Network components may also reserve capacity for the transfer of the subsequent data units of a video download, for example.

The distinction between connectionless and connection-oriented transmission may take place at several layers of the OSI Reference Model. At the OSI Transport Layer TCP is a connection-oriented transport protocol. UDP is connectionless.

Note that connection-oriented communication may still be performed using a first connectionless protocol by adding a second protocol layer including, for example, state above the connectionless protocol. Thus, for example, in such an embodiment (or any other embodiment based on, part of, etc. one or more embodiments described herein or in any specification incorporated by reference) the second protocol layer may perform such functions as reliable transmission, retry, acknowledgement, retransmission, windowing, and/or other similar functions of, features of, properties of, optimizations of etc. a connection-oriented transport protocol, such as TCP, other similar protocol, etc.

In one embodiment, such a second protocol layer above the connectionless protocol (or other protocol etc. carrying one or more multiplexed channels etc.) may perform one or more functions, options, features, optimizations, etc. For example, the multiplexed channels may carry one or more services, applications, etc. such as ssh, vnc, etc. Such services etc. may convey errors, messages, logs, other information etc. for example as part of their function, operation, etc. The second protocol layer and/or associated control logic, software, firmware etc. may detect, intercept, recognize, use, process, store, or otherwise manipulate and use such information. For example, if an ssh connection fails to establish because of an error at the ssh protocol level, the second protocol layer and/or associated control logic, software, firmware etc. may intercept, capture, store, process, analyze, etc. the error and surface, publish, print, forward, store, file, log, etc. the error. Of course, the second protocol layer and/or associated control logic, software, firmware etc. may intercept, capture, store, process, analyze, etc. any information, not just errors. In one embodiment, for example, the second protocol layer and/or associated control logic, software, firmware etc. may detect a common error: the absence of a service on a device. In one embodiment, for example, the second protocol layer and/or associated control logic, software, firmware etc. may detect a pattern of, sequence of, repeated occurrence of, etc. one or more pieces, parts, forms, etc. of such information. In one embodiment, for example, the second protocol layer and/or associated control logic, software, firmware etc. may detect that a time sequence of timestamps is out of order (perhaps due to system clock failure or network time problems etc.). In one embodiment, for example, the second protocol layer and/or associated control logic, software, firmware etc. may forward, store, log, etc. such information to a data processing system, artificial intelligence (AI) system, machine learning (ML) system, and the like for further processing and/or any other purpose, function, etc. Such an AI, ML etc. system may have knowledge that certain data fields are timestamps and thus, with relatively limited learning, recognize when detected, logged, recorded, etc. timestamp information etc. may be incorrect, erroneous, caused by network problems, other causes, effects, and the like etc. In one embodiment, such an ML etc. system may not have knowledge that certain data fields are timestamps and thus, with an increased amount of learning form analysis of thousands or more of records, logs, data etc, may learn to recognize when time or related data, information, fields, etc. may be incorrect, erroneous, caused by network problems, other causes, effects, and the like etc. Such information, generated by AI or ML systems may be useful to perform advance detection of networking problems for example. As an example, a firmware or software update may not be prudent, advised, etc. when system timestamp problems are detected as some files may have incorrect timestamps etc.

In various embodiments, such AI or ML etc, systems operating on logged, collected, assembled, gathered etc. data, information, characteristics, metrics, parameters, measurements, connection data, time information, location or any facet, aspect, etc. of connection(s), connection system(s), device(s), server(s), data transmission system(s), router(s), base station(s), cellular equipment, etc. may recognize, learn to recognize, etc. one or more fields, measures, aspects of such logs with knowledge, programming, configuration etc. of the one or more fields etc.

In various embodiments, such AI or ML or other similar etc, systems, combinations of systems, etc. operating on, processing etc. such logged, collected, assembled, gathered etc. data, information, characteristics, metrics, parameters, measurements, connection data, time information, location or any facet, aspect, etc. of connection(s), connection system(s), device(s), server(s), data transmission system(s), router(s), base station(s), cellular equipment, etc. may recognize, learn to recognize, detect, analyze, compare, etc. one or more fields, measures, aspects of such logs without knowledge, programming, configuration etc. of one or more of the fields etc.

In various embodiments, such AI or ML etc, systems operating on logged, collected, assembled, gathered etc. data, information, characteristics, metrics, parameters, measurements, connection data, time information, location or any facet, aspect, etc. of connection(s), connection system(s), device(s), server(s), data transmission system(s), router(s), base station(s), cellular equipment, etc. may be used to produce, generate, etc. useful information for system operators, customers, users, owners, third-parties, etc. Such collected, generated etc. information, analysis, reports, etc. may be used, for example, to improve connections, measure performance, improve performance, measure bandwidth use, reduce bandwidth use, measure errors, reduce errors, measure failures, report failures, detect failures, eliminate system problems such as failed firmware or software updates or upgrades, alert customers to issues and problems, warn of potential failures or other problems, provide early warning of problems or issues, indicate service required, generate service tickets automatically, order replacement parts or equipment, schedule maintenance, schedule support or service calls, provide failover, provide back-up equipment, schedule copying or back-up of data, transfer services or connections etc. to alternative locations etc, decommission faulty equipment, replace faulty equipment, schedule firmware update, schedule software update, schedule software component upgrade or replacement, schedule application of software patch(es), apply security patch(es), apply software to guard against detected attacks, configure equipment, configure hardware, configure firmware, change build script for software deployment, configure server, configure hardware or software router, configure hardware or software switch, configure hardware firewall, configure software firewall, configure base-station, change protocol(s), configure protocol(s), copy configuration file(s), modify configuration file(s), update configuration file(s), change settings or configuration(s) of software or hardware, suggest or recommend or install software update(s), upgrade customer service level, provide data and information on connections, determine cause of problems, provide statistical use information, guide equipment deployment, measure efficiency, calculate charges and expenses, improve operations, detect abuse, detect security issues, detect hacking attempts, detect or prevent denial of service attacks, throttle services, optimize services, provide billing services, provide use analysis, protect devices, improve security of devices, detect attacks against devices, measure attacks against devices, improve device security, improve access control(s), combinations of these and other features, functions, measures, metrics, and the like etc.

In one embodiment, systems described herein may use connections between devices using connection-oriented communication. In one embodiment, systems described herein may use connections between devices using connection-oriented communication that uses a first proprietary connection-oriented protocol layer above a second connectionless protocol layer. In such an embodiment, the second connectionless protocol layer may be UDP, for example. In such an embodiment, the second connectionless protocol layer may multiplex one or more service protocols (e.g. ssh, vnc, etc.) in one or more UDP datagrams, for example.

Thus, in order to provide an example, merely as one concrete example of a powerful and flexible connection system, one or more systems described herein may use a first proprietary first proprietary connection-oriented protocol layer above a second standard connectionless protocol layer (such as UDP) and the multiplexed services (such as ssh, vnc, etc.) are multiplexed within UDP datagrams at the second UDP layer. This example is provided in order to show the power and flexibility of the types of protocol handling, manipulation, functions and features that may be provided using the types of multiplexing and demultiplexing functions, algorithms, methods, described in various systems herein including descriptions in any of the specifications incorporated by reference.

Thus, for example, in an embodiment where a connectionless protocol layer may multiplex one or more service protocols, different protocols may be multiplexed. Thus, for example, a first protocol using UDP may be multiplexed with a second protocol using TCP. Of course, any number, type, form of standard or non-standard protocols may be multiplexed in any form, fashion, nested to any depth (e.g. protocols within protocols, multiplex to any depth e.g. multiplexing of multiplexed connections, etc.).

In one embodiment, systems described herein may use connections between devices that may be established using a first protocol and then continued using a second protocol. In such an embodiment, systems described herein may use any form of protocol (or protocols, nested protocols, etc.) for the first protocol or the second protocol.

In one embodiment, multiple attachments to a service may be possible. Thus, for example, a second device, device 2, DE2; a third device 3, DE3, (or any number of devices) could connect to, attach to, or otherwise communicate with, share service of, obtain one or more services from, etc. a first device, device 1, or DE1 Thus, for example, using earlier notation, a connection may be established between three devices with connection characteristic {DE2, DE3}-DE1: SE1. The notation is meant to lead the user to realize that a set (in general written as {1, 2, 3 . . . } etc. though exact notation is not important and may vary) of devices (in this case just two devices: DE2 and DE3) are connected to another device (in this case DE1) as peers. Of course any number of connections of any type between any number of devices may be established. In the case of multiple connections, some of the connections may be multiplexed/demultiplexed and some may not be multiplexed/demultiplexed. Thus, for example, first and second services SE1 and SE2 may use a first multiplexed/demultiplexed connection between a first and second device while service 3, SE3, may use a second connection between the first and second device that is not a multiplexed/demultiplexed connection. For example, connections between device 1 and device 2 may be multiplexed/demultiplexed connections, but connections between device 1 and device 3 may be not be multiplexed/demultiplexed connections. For example, some connections between a first device 1 and a second device 2 may be multiplexed/demultiplexed connections, but some connections between the first device 1 and a third device 3 may be not be multiplexed/demultiplexed connections. Thus clearly multiple modes, methods, options, alternatives, configurations, settings, choices of and choices between as well as permutations and combinations, timing, etc. of connections and multiplexed/demultiplexed connections are possible, etc.

In general, connections between multiple devices may be established in any order. If the order of connection is important then a connection may be established with characteristic such as {DE2, DE3}-DE1:SE1 that may indicate device 2 (DE2) establishes connection first (denoted by DE2 appearing first in an ordered list), followed by device 3. Of course, any timing, ordering etc. of connections is possible and any method, means, algorithm of timing, ordering, control of timing and/or ordering of connection or any part of a connection mechanism, algorithm, etc. may be used.

In one embodiment multiple, one or more etc. attachments to a service, application, etc. (e.g. binding via socket or other similar means of socket etc. attachment, association, etc. to service, application, etc.) may be multiplexed, divided, divided and nested hierarchically, etc. In one embodiment, the multiplexing of multiple attachments to a service may be performed by one device. In one embodiment, the multiplexing of multiple attachments to a service may be performed by more than one device. For example, in the case that the multiplexing of multiple attachments to a service may be performed by more than one device, the multiplexing may be layered, nested or otherwise compounded, aggregated, etc in any manner. In one embodiment, multiple socket etc. attachments, bindings, etc. to multiple, one or more, etc. services, applications, etc. on multiple, one or more, etc. devices may be possible using such embodiments as described herein above or similar means, methods etc. described herein or in any specification etc. incorporated by reference.

In one embodiment, one or more of the software components described in any of the systems described herein or in any specification etc. incorporated by reference, including the muxer and demuxer software components for example, may be included, incorporated, embedded etc. in a virtual machine (VM), a VM image (e.g. AWS AMI, AWS EC2 image, other similar program, image, binary image, code unit etc. provided by, supported by, used by, or otherwise related to any provider, service, datacenter etc.), and/or similar container (e.g. Docker container etc.), sandbox, snapshot image, deployment image, isolated environment, combinations of these and the like etc.

In one embodiment, one or more of the software components described in any of the systems described herein or in any specification etc. incorporated by reference, including the muxer and demuxer software components for example, may be included, incorporated, embedded etc. in an automated deployment system (e.g. to be automatically installed, updated, deployed etc. in a device, server, virtual device, virtual server or any similar host, system, environment, etc. It should again be noted that the muxer and/or demuxer software may be stand-alone, integrated, embedded etc. into one or more other software components in any system described herein.

Microservices are a software development technique and a variant of the service-oriented architecture (SOA) architectural style that structures an application (e.g. on a server etc.) as a collection of loosely coupled services. In the context of microservice, the term services may be different from the term service, as used herein for example, to describe a service such as ssh etc. In a microservices architecture, services may be fine-grained and the protocols may be lightweight. A benefit of decomposing an application into smaller services is that it may improve modularity and make an application easier to understand, develop, test, deploy and make an application more resilient to architecture erosion or rot. A microservices architecture may parallelize development by enabling small autonomous teams to develop, deploy and scale microservices independently. A microservices architecture may also allow the architecture of an individual service to emerge through continuous refactoring. Microservice-based architectures may also enable continuous delivery and deployment of an application.

In one embodiment, one or more of the software components described in any of the systems described herein or in any specification etc. incorporated by reference, including the muxer and demuxer software components for example, may be included, incorporated, embedded etc. as a microservice or similar part, portion, component etc. of a larger system etc. Thus, for example, one or more such software components may be deployed, installed, upgraded, configured or otherwise operated on etc. at any time. Thus for example, one or more software components described herein may be deployed, launched, installed, updated, configured etc. (including one or more combinations of these operations, commands, actions etc.) dynamically, on demand, varying with load, during active operation, in parallel with other software components, including for example, the operation of multiple versions, replicas, instances of multiple software components (e.g. in parallel operation, load balancing, etc.).

NOTES ON THE EMBODIMENTS

It should be noted that, one or more aspects of the various embodiments of the present disclosure may be included in an article of manufacture (e.g., one or more computer program products) having, for instance, computer usable media. The media has embodied therein, for instance, computer readable program code for providing and facilitating the capabilities of the various embodiments of the present disclosure. The article of manufacture can be included as a part of a computer system or sold separately.

Additionally, one or more aspects of the various embodiments of the present disclosure may be designed using computer readable program code for providing and/or facilitating the capabilities of the various embodiments or configurations of embodiments of the present disclosure.

Additionally, one or more aspects of the various embodiments of the present disclosure may use computer readable program code for providing and facilitating the capabilities of the various embodiments or configurations of embodiments of the present disclosure and that may be included as a part of a computer system and/or memory system and/or sold separately.

Additionally, at least one non-transitory program storage device readable by a machine, tangibly embodying at least one program of instructions executable by the machine to perform the capabilities of the various embodiments of the present disclosure can be provided.

The diagrams depicted herein are just examples. There may be many variations to these diagrams or the steps (or operations) described therein without departing from the spirit of the various embodiments of the disclosure. For instance, the steps may be performed in a differing order, or steps may be added, deleted or modified.

In various optional embodiments, the features, capabilities, techniques, and/or technology, etc. of the memory and/or storage devices, networks, mobile devices, peripherals, hardware, and/or software, etc. disclosed in the following applications may or may not be incorporated into any of the embodiments disclosed herein.

References in this specification and/or references in specifications incorporated by reference to "one embodiment" may mean that particular aspects, architectures, functions, features, structures, characteristics, etc. of an embodiment that may be described in connection with the embodiment may be included in at least one implementation. Thus references to "in one embodiment" may not necessarily refer to the same embodiment. The particular aspects, etc. may be included in forms other than the particular embodiment described and/or illustrated and all such forms may be encompassed within the scope and claims of the present application.

References in this specification and/or references in specifications incorporated by reference to "for example" may mean that particular aspects, architectures, functions, features, structures, characteristics, etc. described in connection with the embodiment or example may be included in at least one implementation. Thus references to an "example" may not necessarily refer to the same embodiment, example, etc. The particular aspects, etc. may be included in forms other than the particular embodiment or example described and/or illustrated and all such forms may be encompassed within the scope and claims of the present application.

This specification and/or specifications incorporated by reference may refer to a list of alternatives. For example, a first reference such as "A (e.g., B, C, D, E, etc.)" may refer to a list of alternatives to A including (but not limited to) B, C, D, E. A second reference to "A, etc." may then be equivalent to the first reference to "A (e.g., B, C, D, E, etc.)." Thus, a reference to "A, etc." may be interpreted to mean "A (e.g., B, C, D, E, etc.)."

It may thus be seen from the examples provided above that the improvements to devices (e.g., as shown in the contexts of the figures included in this specification, for example) may be used in various applications, contexts, environments, etc. The applications, uses, etc. of these improvements, etc. may not be limited to those described above, but may be used, for example, in combination. For example, one or more applications, etc. used in the contexts, for example, in one or more figures may be used in combination with one or more applications, etc. used in the contexts of, for example, one or more other figures and/or one or more applications, etc. described in any specifications incorporated by reference. Further, while various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   automatically identifying a device connected to a network utilizing a unique identifier associated with the device; and
   automatically configuring the device without knowledge of an internet protocol (IP) address associated with the device, wherein the configured device is associated with a user, and wherein the user is permitted to grant varying degrees of permission to further configure the device to at least one other user; and
   linking the device to an account;
   wherein the device connected to the network is a target device accessed by multiplexing and demultiplexing multiple services on a single network connection, including:
      receiving, from a source device at a single port of the target device, the single network connection representing a plurality of different network connections for the multiple services, wherein the source device is configured to include a multiplexer that multiplexes the plurality of different network connections for the multiple services into the single network connection, and
      responsive to receiving the single network connection at the single port, demultiplexing, by the target device, the single network connection into the plurality of different network connections for the multiple services.

2. The method of claim 1, wherein the device is accessed by one or more internet communication ports.

3. The method of claim 2, wherein the one or more internet communication ports are configured by the user to provide one or more services, applications, or programs.

4. The method of claim 1, wherein the single network connection uses TCP/IP.

5. The method of claim 1, wherein the access uses a localhost connection.

6. The method of claim 1, wherein the single network connection is established using a command listing a source port and a corresponding target port for each different network connection of the plurality of different network connections.

7. The method of claim 6, wherein demultiplexing, by the target device, the single network connection into the plurality of different network connections for the multiple services includes:
   decoding the command to determine the source port and the corresponding target port requested for the each different network connection of the plurality of different network connections, and creating requested target ports for establishing the plurality of different network connections.

8. The method of claim 7, wherein the source port is located on the source device and the corresponding target port is located on the target device.

9. The method of claim 8, wherein the source port is different for the each different network connection of the plurality of different network connections.

10. The method of claim 9, wherein the source ports for the plurality of different network connections include UDP and TCP ports.

11. The method of claim 1, wherein the target device includes a demultiplexer that demultiplexes the single network connection into the plurality of different network connections for the multiple services, and wherein the demultiplexer is configured by a configuration file that restricts which ports the multiplexer is allowed to access.

12. A non-transitory computer readable medium storing computer code executable by a processor to perform a method comprising:
   automatically identifying a device connected to a network utilizing a unique identifier associated with the device; and
   automatically configuring the device without knowledge of an internet protocol (IP) address associated with the device, wherein the configured device is associated with a user, and wherein the user is permitted to grant varying degrees of permission to further configure the device to at least one other user; and
   linking the device to an account;
   wherein the device connected to the network is a target device accessed by multiplexing and demultiplexing multiple services on a single network connection including:
      receiving, from a source device at a single port of the target device, the single network connection representing a plurality of different network connections for the multiple services, wherein the source device is configured to include a multiplexer that multiplexes the plurality of different network connections for the multiple services into the single network connection, and
      responsive to receiving the single network connection at the single port, demultiplexing, by the target device, the single network connection into the plurality of different network connections for the multiple services.

13. The non-transitory computer readable medium of claim 12, wherein the device is accessed by one or more internet communication ports.

14. The non-transitory computer readable medium of claim 13, wherein the one or more internet communication ports are configured by the user to provide one or more services, applications, or programs.

15. The non-transitory computer readable medium of claim 12, wherein the single network connection uses TCP/IP.

16. The non-transitory computer readable medium of claim 12, wherein the access uses a localhost connection.

17. A device, comprising:
   a memory, and
   a processor in communication with the memory to perform a method comprising:
   receiving an automatic configuration of the device based on an automatic identification of the device utilizing a unique identifier associated with the device;
   permitting a user associated with the device to grant varying degrees of permission to further configure the device to at least one other user;
   wherein the device connected to a network is a target device accessed by multiplexing and demultiplexing multiple services on a single network connection including:
      receiving, from a source device at a single port of the target device, the single network connection representing a plurality of different network connections for the multiple services, wherein the source device is configured to include a multiplexer that multiplexes the plurality of different network connections for the multiple services into the single network connection, and
      responsive to receiving the single network connection at the single port, demultiplexing, by the target device, the single network connection into the plurality of different network connections for the multiple services.

* * * * *